US012707034B2

(12) United States Patent
Korman

(10) Patent No.: US 12,707,034 B2
(45) Date of Patent: Aug. 11, 2026

(54) VIRTUAL REALITY FILM HYBRIDIZATION

(71) Applicant: Kinetoscope Media LLC, Los Altos Hills, CA (US)

(72) Inventor: Max Korman, Los Altos Hills, CA (US)

(73) Assignee: Kinetoscope Media LLC, Los Altos Hills, CA (US)

( * ) Notice: Subject to any disclaimer, the term of this patent is extended or adjusted under 35 U.S.C. 154(b) by 365 days.

(21) Appl. No.: 18/051,372

(22) Filed: Oct. 31, 2022

(65) Prior Publication Data

US 2023/0231982 A1 Jul. 20, 2023

Related U.S. Application Data

(63) Continuation of application No. PCT/US2021/031397, filed on May 7, 2021.

(60) Provisional application No. 63/022,122, filed on May 8, 2020.

(51) Int. Cl.

| | |
|---|---|
| ***H04N 13/156*** | (2018.01) |
| ***H04N 13/239*** | (2018.01) |
| ***H04N 13/344*** | (2018.01) |
| ***H04N 13/366*** | (2018.01) |
| ***H04N 23/698*** | (2023.01) |

(52) U.S. Cl.

CPC ......... *H04N 13/156* (2018.05); *H04N 13/239* (2018.05); *H04N 13/344* (2018.05); *H04N 13/366* (2018.05); *H04N 23/698* (2023.01)

(58) Field of Classification Search

CPC .. H04N 13/156; H04N 13/239; H04N 13/344; H04N 13/366; H04N 23/698; H04N 21/816

See application file for complete search history.

(56) References Cited

U.S. PATENT DOCUMENTS

| | | | | |
|---|---|---|---|---|
| 10,127,727 | B1 * | 11/2018 | Yuan | G06F 3/013 |
| 10,567,744 | B1 | 2/2020 | Giguere et al. | |
| 2015/0206320 | A1 | 7/2015 | Itani et al. | |
| 2016/0042233 | A1 | 2/2016 | Sen et al. | |
| 2017/0251181 | A1 | 8/2017 | Smolyanskiy et al. | |
| 2018/0261010 | A1 * | 9/2018 | Kudirka | A63B 24/0021 |
| 2019/0141252 | A1 * | 5/2019 | Pallamsetty | G06F 3/017 |
| 2019/0313075 | A1 * | 10/2019 | Moss | H04N 13/194 |

(Continued)

FOREIGN PATENT DOCUMENTS

| | | |
|---|---|---|
| WO | WO-2020069049 A1 | 4/2020 |
| WO | WO-2021226528 A1 | 11/2021 |

OTHER PUBLICATIONS

Kimber, et al. FlyAbout: Spatially Indexed Panoramic Video. Multimedia '01: Proceedings of the ninth ACM international conference on Multimedia, pp. 339-347 (2001). Retrieved at URL: https://www.researchgate.net/profile/Surapong-Lertsithichai/publication/2379023_FlyAbout_Spatially_Indexed_Panoramic_Video/links/00b7d519b8ecdf0bae000000/FlyAbout-Spatially-Indexed-Panoramic-Video.pdf. 10 pages.

(Continued)

*Primary Examiner* — Tat C Chio

(74) *Attorney, Agent, or Firm* — Wilson Sonsini Goodrich & Rosati

(57) ABSTRACT

Described are methods, systems, and media for immersive content. Also described herein are camera assemblies for capturing unidirectional immersive three-dimensional images and video with wide ranges of focal lengths.

27 Claims, 16 Drawing Sheets

(56) References Cited

U.S. PATENT DOCUMENTS

| | | | | |
|---|---|---|---|---|
| 2020/0380718 | A1* | 12/2020 | Schoch | A61B 1/00071 |
| 2021/0211826 | A1* | 7/2021 | Redmann | G06F 3/011 |

OTHER PUBLICATIONS

PCT/US2021/031397 International Search Report and Written Opinion dated Oct. 4, 2021.
PCT/US2021/031397 Invitation to Pay Additional Fees dated Jul. 13, 2021.

* cited by examiner

600

600

Browser-based GUI
Mobile GUI
WAP
HTTP(S)
Native Mobile
Internet
CDN
Content
1600
Web Server 1
Web Server 2
...
Web Server N
REST/XML
JSON
APIs
1610
App Server 1
App Server 2
...
App Server N
1620
DB 1
DB 2
DB N
1630

VIRTUAL REALITY FILM HYBRIDIZATION

CROSS-REFERENCE

This application is a continuation application of International Patent Application No. PCT/US21/31397, filed May 7, 2021, which claims the benefit of U.S. Provisional Application No. 63/022,122, filed May 8, 2020, each of which is hereby incorporated by reference in its entirety herein.

BACKGROUND

One of the many currently available methods for the display of media is with a head-mounted display, capable of a three-dimensional display of data. Such three-dimensional displays provide encompassing views for visceral immersive experiences.

SUMMARY

In one aspect, disclosed herein is a computer-implemented method of forming a unidirectional immersive three-dimensional video comprising: receiving a plurality of first two-dimensional images captured from a first point of view; receiving a plurality of second two-dimensional images captured during the capture of the plurality of first two-dimensional images and from a second point of view that is different from the first point of view; overlaying a first image window over each of the plurality of first two-dimensional images; overlaying a second image window over each of the plurality of second two-dimensional images; and combining the plurality of overlaid first two-dimensional images and the plurality of overlaid second two-dimensional images to form the unidirectional immersive three-dimensional video.

In some embodiments, the first point of view and the second point of view are separated by about 0.25 inches to about 600 inches. In some embodiments, the first point of view and the second point of view are separated by about 0.25 inches to about 0.5 inches, about 0.25 inches to about 1 inch, about 0.25 inches to about 5 inches, about 0.25 inches to about 10 inches, about 0.25 inches to about 25 inches, about 0.25 inches to about 50 inches, about 0.25 inches to about 100 inches, about 0.25 inches to about 200 inches, about 0.25 inches to about 400 inches, about 0.25 inches to about 600 inches, about 0.5 inches to about 1 inch, about 0.5 inches to about 5 inches, about 0.5 inches to about 10 inches, about 0.5 inches to about 25 inches, about 0.5 inches to about 50 inches, about 0.5 inches to about 100 inches, about 0.5 inches to about 200 inches, about 0.5 inches to about 400 inches, about 0.5 inches to about 600 inches, about 1 inch to about 5 inches, about 1 inch to about 10 inches, about 1 inch to about 25 inches, about 1 inch to about 50 inches, about 1 inch to about 100 inches, about 1 inch to about 200 inches, about 1 inch to about 400 inches, about 1 inch to about 600 inches, about 5 inches to about 10 inches, about 5 inches to about 25 inches, about 5 inches to about 50 inches, about 5 inches to about 100 inches, about 5 inches to about 200 inches, about 5 inches to about 400 inches, about 5 inches to about 600 inches, about 10 inches to about 25 inches, about 10 inches to about 50 inches, about 10 inches to about 100 inches, about 10 inches to about 200 inches, about 10 inches to about 400 inches, about 10 inches to about 600 inches, about 25 inches to about 50 inches, about 25 inches to about 100 inches, about 25 inches to about 200 inches, about 25 inches to about 400 inches, about 25 inches to about 600 inches, about 50 inches to about 100 inches, about 50 inches to about 200 inches, about 50 inches to about 400 inches, about 50 inches to about 600 inches, about 100 inches to about 200 inches, about 100 inches to about 400 inches, about 100 inches to about 600 inches, about 200 inches to about 400 inches, about 200 inches to about 600 inches, or about 400 inches to about 600 inches, including increments therein. In some embodiments, the first point of view and the second point of view are separated by about 0.25 inches, about 0.5 inches, about 1 inch, about 5 inches, about 10 inches, about 25 inches, about 50 inches, about 100 inches, about 200 inches, about 400 inches, or about 600 inches. In some embodiments, the first point of view and the second point of view are separated by at least about 0.25 inches, about 0.5 inches, about 1 inch, about 5 inches, about 10 inches, about 25 inches, about 50 inches, about 100 inches, about 200 inches, or about 400 inches. In some embodiments, the first point of view and the second point of view are separated by at most about 0.5 inches, about 1 inch, about 5 inches, about 10 inches, about 25 inches, about 50 inches, about 100 inches, about 200 inches, about 400 inches, or about 600 inches.

In some embodiments, a first viewing axis of the first point of view and a second viewing axis of the second point of view are parallel. In some embodiments, a first viewing axis of the first point of view and a second viewing axis of the second point of view are oblique. In some embodiments, the first image window and the second image window are congruent. In some embodiments, the first image window and the second image window are incongruent. In some embodiments, the first image window comprises a primary first image window for a first portion of the first two-dimensional images and a secondary first image window for a second portion of the first two-dimensional images. In some embodiments, the primary first image window and the secondary first image window are incongruent. In some embodiments, the second image window comprises a primary second image window for a second portion of the second two-dimensional images and a secondary second image window for a second portion of the second two-dimensional images. In some embodiments, the primary second image window and the secondary second image window are incongruent.

In some embodiments, a vertical field of view of at least one of the first image window and the second image window is about 80 degrees to about 200 degrees. In some embodiments, a vertical field of view of at least one of the first image window and the second image window is about 80 degrees to about 90 degrees, about 80 degrees to about 100 degrees, about 80 degrees to about 120 degrees, about 80 degrees to about 140 degrees, about 80 degrees to about 160 degrees, about 80 degrees to about 180 degrees, about 80 degrees to about 200 degrees, about 90 degrees to about 100 degrees, about 90 degrees to about 120 degrees, about 90 degrees to about 140 degrees, about 90 degrees to about 160 degrees, about 90 degrees to about 180 degrees, about 90 degrees to about 200 degrees, about 100 degrees to about 120 degrees, about 100 degrees to about 140 degrees, about 100 degrees to about 160 degrees, about 100 degrees to about 180 degrees, about 100 degrees to about 200 degrees, about 120 degrees to about 140 degrees, about 120 degrees to about 160 degrees, about 120 degrees to about 180 degrees, about 120 degrees to about 200 degrees, about 140 degrees to about 160 degrees, about 140 degrees to about 180 degrees, about 140 degrees to about 200 degrees, about 160 degrees to about 180 degrees, about 160 degrees to about 200 degrees, or about 180 degrees to about 200 degrees. In some embodiments, a vertical field of view of at least one of the first image window and the second image window is about 80 degrees, about 90 degrees, about 100 degrees, about 120 degrees, about 140 degrees, about 160 degrees, about 180 degrees, or about 200 degrees. In some embodiments, a vertical field of view of at least one of the first image window and the second image window is at least about 80 degrees, about 90 degrees, about 100 degrees, about 120 degrees, about 140 degrees, about 160 degrees, or about 180 degrees. In some embodiments, a vertical field of view of at least one of the first image window and the second image window is at most about 90 degrees, about 100 degrees, about 120 degrees, about 140 degrees, about 160 degrees, about 180 degrees, or about 200 degrees.

In some embodiments, a horizontal field of view of at least one of the first image window and the second image window is about 80 degrees to about 200 degrees. In some embodiments, a horizontal field of view of at least one of the first image window and the second image window is about 80 degrees to about 90 degrees, about 80 degrees to about 100 degrees, about 80 degrees to about 120 degrees, about 80 degrees to about 140 degrees, about 80 degrees to about 160 degrees, about 80 degrees to about 180 degrees, about 80 degrees to about 200 degrees, about 90 degrees to about 100 degrees, about 90 degrees to about 120 degrees, about 90 degrees to about 140 degrees, about 90 degrees to about 160 degrees, about 90 degrees to about 180 degrees, about 90 degrees to about 200 degrees, about 100 degrees to about 120 degrees, about 100 degrees to about 140 degrees, about 100 degrees to about 160 degrees, about 100 degrees to about 180 degrees, about 100 degrees to about 200 degrees, about 120 degrees to about 140 degrees, about 120 degrees to about 160 degrees, about 120 degrees to about 180 degrees, about 120 degrees to about 200 degrees, about 140 degrees to about 160 degrees, about 140 degrees to about 180 degrees, about 140 degrees to about 200 degrees, about 160 degrees to about 180 degrees, about 160 degrees to about 200 degrees, or about 180 degrees to about 200 degrees. In some embodiments, a horizontal field of view of at least one of the first image window and the second image window is about 80 degrees, about 90 degrees, about 100 degrees, about 120 degrees, about 140 degrees, about 160 degrees, about 180 degrees, or about 200 degrees. In some embodiments, a horizontal field of view of at least one of the first image window and the second image window is at least about 80 degrees, about 90 degrees, about 100 degrees, about 120 degrees, about 140 degrees, about 160 degrees, or about 180 degrees. In some embodiments, a horizontal field of view of at least one of the first image window and the second image window is at most about 90 degrees, about 100 degrees, about 120 degrees, about 140 degrees, about 160 degrees, about 180 degrees, or about 200 degrees.

In some embodiments, at least one of the first image window and the second image window have a shape comprising a circle, a square, an oval, an ellipse, a rounded square, a polygon, or any combination thereof. In some embodiments, at least one of the plurality of second two-dimensional images and the plurality of first two-dimensional images are captured by a camera with a probe lens.

Another aspect provided herein is a computer-implemented system comprising: a digital processing device comprising: at least one processor, an operating system configured to perform executable instructions, a memory, and a computer program including instructions executable by the digital processing device to create an application which performs at least the following: receiving a plurality of first two-dimensional images captured from a first point of view; receiving a plurality of second two-dimensional images captured during the capture of the plurality of first two-dimensional images and from a second point of view that is different from the first point of view; overlaying a first image window over each of the plurality of first two-dimensional images; overlaying a second image window over each of the plurality of second two-dimensional images; and combining the plurality of overlaid first two-dimensional images and the plurality of overlaid second two-dimensional images to form the unidirectional immersive three-dimensional video.

In some embodiments, the first point of view and the second point of view are separated by about 0.25 inches to about 600 inches. In some embodiments, the first point of view and the second point of view are separated by about 0.25 inches to about 0.5 inches, about 0.25 inches to about 1 inch, about 0.25 inches to about 5 inches, about 0.25 inches to about 10 inches, about 0.25 inches to about 25 inches, about 0.25 inches to about 50 inches, about 0.25 inches to about 100 inches, about 0.25 inches to about 200 inches, about 0.25 inches to about 400 inches, about 0.25 inches to about 600 inches, about 0.5 inches to about 1 inch, about 0.5 inches to about 5 inches, about 0.5 inches to about 10 inches, about 0.5 inches to about 25 inches, about 0.5 inches to about 50 inches, about 0.5 inches to about 100 inches, about 0.5 inches to about 200 inches, about 0.5 inches to about 400 inches, about 0.5 inches to about 600 inches, about 1 inch to about 5 inches, about 1 inch to about 10 inches, about 1 inch to about 25 inches, about 1 inch to about 50 inches, about 1 inch to about 100 inches, about 1 inch to about 200 inches, about 1 inch to about 400 inches, about 1 inch to about 600 inches, about 5 inches to about 10 inches, about 5 inches to about 25 inches, about 5 inches to about 50 inches, about 5 inches to about 100 inches, about 5 inches to about 200 inches, about 5 inches to about 400 inches, about 5 inches to about 600 inches, about 10 inches to about 25 inches, about 10 inches to about 50 inches, about 10 inches to about 100 inches, about 10 inches to about 200 inches, about 10 inches to about 400 inches, about 10 inches to about 600 inches, about 25 inches to about 50 inches, about 25 inches to about 100 inches, about 25 inches to about 200 inches, about 25 inches to about 400 inches, about 25 inches to about 600 inches, about 50 inches to about 100 inches, about 50 inches to about 200 inches, about 50 inches to about 400 inches, about 50 inches to about 600 inches, about 100 inches to about 200 inches, about 100 inches to about 400 inches, about 100 inches to about 600 inches, about 200 inches to about 400 inches, about 200 inches to about 600 inches, or about 400 inches to about 600 inches, including increments therein. In some embodiments, the first point of view and the second point of view are separated by about 0.25 inches, about 0.5 inches, about 1 inch, about 5 inches, about 10 inches, about 25 inches, about 50 inches, about 100 inches, about 200 inches, about 400 inches, or about 600 inches. In some embodiments, the first point of view and the second point of view are separated by at least about 0.25 inches, about 0.5 inches, about 1 inch, about 5 inches, about 10 inches, about 25 inches, about 50 inches, about 100 inches, about 200 inches, or about 400 inches. In some embodiments, the first point of view and the second point of view are separated by at most about 0.5 inches, about 1 inch, about 5 inches, about 10 inches, about 25 inches, about 50 inches, about 100 inches, about 200 inches, about 400 inches, or about 600 inches.

In some embodiments, a first viewing axis of the first point of view and a second viewing axis of the second point of view are parallel. In some embodiments, a first viewing axis of the first point of view and a second viewing axis of the second point of view are oblique. In some embodiments, the first image window and the second image window are congruent. In some embodiments, the first image window and the second image window are incongruent. In some embodiments, the first image window comprises a primary first image window for a first portion of the first two-dimensional images and a secondary first image window for a second portion of the first two-dimensional images. In some embodiments, the primary first image window and the secondary first image window are incongruent. In some embodiments, the second image window comprises a primary second image window for a second portion of the second two-dimensional images and a secondary second image window for a second portion of the second two-dimensional images. In some embodiments, the primary second image window and the secondary second image window are incongruent.

In some embodiments, a vertical field of view of at least one of the first image window and the second image window is about 80 degrees to about 200 degrees. In some embodiments, a vertical field of view of at least one of the first image window and the second image window is about 80 degrees to about 90 degrees, about 80 degrees to about 100 degrees, about 80 degrees to about 120 degrees, about 80 degrees to about 140 degrees, about 80 degrees to about 160 degrees, about 80 degrees to about 180 degrees, about 80 degrees to about 200 degrees, about 90 degrees to about 100 degrees, about 90 degrees to about 120 degrees, about 90 degrees to about 140 degrees, about 90 degrees to about 160 degrees, about 90 degrees to about 180 degrees, about 90 degrees to about 200 degrees, about 100 degrees to about 120 degrees, about 100 degrees to about 140 degrees, about 100 degrees to about 160 degrees, about 100 degrees to about 180 degrees, about 100 degrees to about 200 degrees, about 120 degrees to about 140 degrees, about 120 degrees to about 160 degrees, about 120 degrees to about 180 degrees, about 120 degrees to about 200 degrees, about 140 degrees to about 160 degrees, about 140 degrees to about 180 degrees, about 140 degrees to about 200 degrees, about 160 degrees to about 180 degrees, about 160 degrees to about 200 degrees, or about 180 degrees to about 200 degrees. In some embodiments, a vertical field of view of at least one of the first image window and the second image window is about 80 degrees, about 90 degrees, about 100 degrees, about 120 degrees, about 140 degrees, about 160 degrees, about 180 degrees, or about 200 degrees. In some embodiments, a vertical field of view of at least one of the first image window and the second image window is at least about 80 degrees, about 90 degrees, about 100 degrees, about 120 degrees, about 140 degrees, about 160 degrees, or about 180 degrees. In some embodiments, a vertical field of view of at least one of the first image window and the second image window is at most about 90 degrees, about 100 degrees, about 120 degrees, about 140 degrees, about 160 degrees, about 180 degrees, or about 200 degrees.

In some embodiments, a horizontal field of view of at least one of the first image window and the second image window is about 80 degrees to about 200 degrees. In some embodiments, a horizontal field of view of at least one of the first image window and the second image window is about 80 degrees to about 90 degrees, about 80 degrees to about 100 degrees, about 80 degrees to about 120 degrees, about 80 degrees to about 140 degrees, about 80 degrees to about 160 degrees, about 80 degrees to about 180 degrees, about 80 degrees to about 200 degrees, about 90 degrees to about 100 degrees, about 90 degrees to about 120 degrees, about 90 degrees to about 140 degrees, about 90 degrees to about 160 degrees, about 90 degrees to about 180 degrees, about 90 degrees to about 200 degrees, about 100 degrees to about 120 degrees, about 100 degrees to about 140 degrees, about 100 degrees to about 160 degrees, about 100 degrees to about 180 degrees, about 100 degrees to about 200 degrees, about 120 degrees to about 140 degrees, about 120 degrees to about 160 degrees, about 120 degrees to about 180 degrees, about 120 degrees to about 200 degrees, about 140 degrees to about 160 degrees, about 140 degrees to about 180 degrees, about 140 degrees to about 200 degrees, about 160 degrees to about 180 degrees, about 160 degrees to about 200 degrees, or about 180 degrees to about 200 degrees. In some embodiments, a horizontal field of view of at least one of the first image window and the second image window is about 80 degrees, about 90 degrees, about 100 degrees, about 120 degrees, about 140 degrees, about 160 degrees, about 180 degrees, or about 200 degrees. In some embodiments, a horizontal field of view of at least one of the first image window and the second image window is at least about 80 degrees, about 90 degrees, about 100 degrees, about 120 degrees, about 140 degrees, about 160 degrees, or about 180 degrees. In some embodiments, a horizontal field of view of at least one of the first image window and the second image window is at most about 90 degrees, about 100 degrees, about 120 degrees, about 140 degrees, about 160 degrees, about 180 degrees, or about 200 degrees.

In some embodiments, at least one of the first image window and the second image window have a shape comprising a circle, a square, an oval, an ellipse, a rounded square, a polygon, or any combination thereof. In some embodiments, at least one of the plurality of second two-dimensional images and the plurality of first two-dimensional images are captured by a camera with a probe lens.

Another aspect provided herein is a non-transitory computer-readable storage media encoded with a computer program including instructions executable by a processor to create an application performing at least the following: receiving a plurality of first two-dimensional images captured from a first point of view; receiving a plurality of second two-dimensional images captured during the capture of the plurality of first two-dimensional images and from a second point of view that is different from the first point of view; overlaying a first image window over each of the plurality of first two-dimensional images; overlaying a second image window over each of the plurality of second two-dimensional images; and combining the plurality of overlaid first two-dimensional images and the plurality of overlaid second two-dimensional images to form the unidirectional immersive three-dimensional video.

In some embodiments, the first point of view and the second point of view are separated by about 0.25 inches to about 600 inches. In some embodiments, the first point of view and the second point of view are separated by about 0.25 inches to about 0.5 inches, about 0.25 inches to about 1 inch, about 0.25 inches to about 5 inches, about 0.25 inches to about 10 inches, about 0.25 inches to about 25 inches, about 0.25 inches to about 50 inches, about 0.25 inches to about 100 inches, about 0.25 inches to about 200 inches, about 0.25 inches to about 400 inches, about 0.25 inches to about 600 inches, about 0.5 inches to about 1 inch, about 0.5 inches to about 5 inches, about 0.5 inches to about 10 inches, about 0.5 inches to about 25 inches, about 0.5 inches to about 50 inches, about 0.5 inches to about 100 inches, about 0.5 inches to about 200 inches, about 0.5 inches to about 400 inches, about 0.5 inches to about 600 inches, about 1 inch to about 5 inches, about 1 inch to about 10 inches, about 1 inch to about 25 inches, about 1 inch to about 50 inches, about 1 inch to about 100 inches, about 1 inch to about 200 inches, about 1 inch to about 400 inches, about 1 inch to about 600 inches, about 5 inches to about 10 inches, about 5 inches to about 25 inches, about 5 inches to about 50 inches, about 5 inches to about 100 inches, about 5 inches to about 200 inches, about 5 inches to about 400 inches, about 5 inches to about 600 inches, about 10 inches to about 25 inches, about 10 inches to about 50 inches, about 10 inches to about 100 inches, about 10 inches to about 200 inches, about 10 inches to about 400 inches, about 10 inches to about 600 inches, about 25 inches to about 50 inches, about 25 inches to about 100 inches, about 25 inches to about 200 inches, about 25 inches to about 400 inches, about 25 inches to about 600 inches, about 50 inches to about 100 inches, about 50 inches to about 200 inches, about 50 inches to about 400 inches, about 50 inches to about 600 inches, about 100 inches to about 200 inches, about 100 inches to about 400 inches, about 100 inches to about 600 inches, about 200 inches to about 400 inches, about 200 inches to about 600 inches, or about 400 inches to about 600 inches, including increments therein. In some embodiments, the first point of view and the second point of view are separated by about 0.25 inches, about 0.5 inches, about 1 inch, about 5 inches, about 10 inches, about 25 inches, about 50 inches, about 100 inches, about 200 inches, about 400 inches, or about 600 inches. In some embodiments, the first point of view and the second point of view are separated by at least about 0.25 inches, about 0.5 inches, about 1 inch, about 5 inches, about 10 inches, about 25 inches, about 50 inches, about 100 inches, about 200 inches, or about 400 inches. In some embodiments, the first point of view and the second point of view are separated by at most about 0.5 inches, about 1 inch, about 5 inches, about 10 inches, about 25 inches, about 50 inches, about 100 inches, about 200 inches, about 400 inches, or about 600 inches.

In some embodiments, a first viewing axis of the first point of view and a second viewing axis of the second point of view are parallel. In some embodiments, a first viewing axis of the first point of view and a second viewing axis of the second point of view are oblique. In some embodiments, the first image window and the second image window are congruent. In some embodiments, the first image window and the second image window are incongruent. In some embodiments, the first image window comprises a primary first image window for a first portion of the first two-dimensional images and a secondary first image window for a second portion of the first two-dimensional images. In some embodiments, the primary first image window and the secondary first image window are incongruent. In some embodiments, the second image window comprises a primary second image window for a second portion of the second two-dimensional images and a secondary second image window for a second portion of the second two-dimensional images. In some embodiments, the primary second image window and the secondary second image window are incongruent.

In some embodiments, a vertical field of view of at least one of the first image window and the second image window is about 80 degrees to about 200 degrees. In some embodiments, a vertical field of view of at least one of the first image window and the second image window is about 80 degrees to about 90 degrees, about 80 degrees to about 100 degrees, about 80 degrees to about 120 degrees, about 80 degrees to about 140 degrees, about 80 degrees to about 160 degrees, about 80 degrees to about 180 degrees, about 80 degrees to about 200 degrees, about 90 degrees to about 100 degrees, about 90 degrees to about 120 degrees, about 90 degrees to about 140 degrees, about 90 degrees to about 160 degrees, about 90 degrees to about 180 degrees, about 90 degrees to about 200 degrees, about 100 degrees to about 120 degrees, about 100 degrees to about 140 degrees, about 100 degrees to about 160 degrees, about 100 degrees to about 180 degrees, about 100 degrees to about 200 degrees, about 120 degrees to about 140 degrees, about 120 degrees to about 160 degrees, about 120 degrees to about 180 degrees, about 120 degrees to about 200 degrees, about 140 degrees to about 160 degrees, about 140 degrees to about 180 degrees, about 140 degrees to about 200 degrees, about 160 degrees to about 180 degrees, about 160 degrees to about 200 degrees, or about 180 degrees to about 200 degrees. In some embodiments, a vertical field of view of at least one of the first image window and the second image window is about 80 degrees, about 90 degrees, about 100 degrees, about 120 degrees, about 140 degrees, about 160 degrees, about 180 degrees, or about 200 degrees. In some embodiments, a vertical field of view of at least one of the first image window and the second image window is at least about 80 degrees, about 90 degrees, about 100 degrees, about 120 degrees, about 140 degrees, about 160 degrees, or about 180 degrees. In some embodiments, a vertical field of view of at least one of the first image window and the second image window is at most about 90 degrees, about 100 degrees, about 120 degrees, about 140 degrees, about 160 degrees, about 180 degrees, or about 200 degrees.

In some embodiments, a horizontal field of view of at least one of the first image window and the second image window is about 80 degrees to about 200 degrees. In some embodiments, a horizontal field of view of at least one of the first image window and the second image window is about 80 degrees to about 90 degrees, about 80 degrees to about 100 degrees, about 80 degrees to about 120 degrees, about 80 degrees to about 140 degrees, about 80 degrees to about 160 degrees, about 80 degrees to about 180 degrees, about 80 degrees to about 200 degrees, about 90 degrees to about 100 degrees, about 90 degrees to about 120 degrees, about 90 degrees to about 140 degrees, about 90 degrees to about 160 degrees, about 90 degrees to about 180 degrees, about 90 degrees to about 200 degrees, about 100 degrees to about 120 degrees, about 100 degrees to about 140 degrees, about 100 degrees to about 160 degrees, about 100 degrees to about 180 degrees, about 100 degrees to about 200 degrees, about 120 degrees to about 140 degrees, about 120 degrees to about 160 degrees, about 120 degrees to about 180 degrees, about 120 degrees to about 200 degrees, about 140 degrees to about 160 degrees, about 140 degrees to about 180 degrees, about 140 degrees to about 200 degrees, about 160 degrees to about 180 degrees, about 160 degrees to about 200 degrees, or about 180 degrees to about 200 degrees. In some embodiments, a horizontal field of view of at least one of the first image window and the second image window is about 80 degrees, about 90 degrees, about 100 degrees, about 120 degrees, about 140 degrees, about 160 degrees, about 180 degrees, or about 200 degrees. In some embodiments, a horizontal field of view of at least one of the first image window and the second image window is at least about 80 degrees, about 90 degrees, about 100 degrees, about 120 degrees, about 140 degrees, about 160 degrees, or about 180 degrees. In some embodiments, a horizontal field of view of at least one of the first image window and the second image window is at most about 90 degrees, about 100 degrees, about 120 degrees, about 140 degrees, about 160 degrees, about 180 degrees, or about 200 degrees.

In some embodiments, at least one of the first image window and the second image window have a shape comprising a circle, a square, an oval, an ellipse, a rounded square, a polygon, or any combination thereof. In some embodiments, at least one of the plurality of second two-dimensional images and the plurality of first two-dimensional images are captured by a camera with a probe lens.

Another aspect provided herein is a system for capturing a three-dimensional video comprising: two or more cameras; a probe lens coupled to each of the two or more cameras; wherein the probe lenses of each of the two or more cameras are separated by a distance of about 0.25 inches to about 600 inches.

In some embodiments, the probe lens coupled to a first camera has a greater length than the probe lens coupled to a second camera. In some embodiments, a sensor of a first camera of the two or more cameras and a sensor of a second camera of the two or more cameras are non-coplanar.

Another aspect provided herein is a method of presenting 3-dimensional (3D) virtual reality (VR) media, comprising: defining an viewing window at a predetermined distance relative to and in proximity to a viewer's eye position, wherein the viewing window comprises a shape and an aspect ratio that are optimized for the viewer's viewing of the 3D VR media on a VR headset; and providing a plurality of content planes located at a plurality of different depths relative to the viewing window, wherein the plurality of content planes comprises media content that overlay at the different depths to generate the 3D VR media; wherein the plurality of content planes are located further away from the viewer's eye position than the viewing window to reduce or eliminate the effects of window violations, thereby enhancing the viewer's viewing and immersivity experience of the 3D VR media on the VR headset.

In some embodiments, the 3D VR media comprises video captured using a stereoscopic camera. In some embodiments, the viewing window is located between the viewer's eye position and the plurality of content planes. In some embodiments, the viewing window has a curved rectangular shape.

In some embodiments, a radius of curvature at one or more corners of the viewing window is about 1 mm to about 10,000 mm. In some embodiments, a radius of curvature at one or more corners of the viewing window is about 1 mm to about 5 mm, about 1 mm to about 10 mm, about 1 mm to about 50 mm, about 1 mm to about 100 mm, about 1 mm to about 500 mm, about 1 mm to about 1,000 mm, about 1 mm to about 5,000 mm, about 1 mm to about 10,000 mm, about 5 mm to about 10 mm, about 5 mm to about 50 mm, about 5 mm to about 100 mm, about 5 mm to about 500 mm, about 5 mm to about 1,000 mm, about 5 mm to about 5,000 mm, about 5 mm to about 10,000 mm, about 10 mm to about 50 mm, about 10 mm to about 100 mm, about 10 mm to about 500 mm, about 10 mm to about 1,000 mm, about 10 mm to about 5,000 mm, about 10 mm to about 10,000 mm, about 50 mm to about 100 mm, about 50 mm to about 500 mm, about 50 mm to about 1,000 mm, about 50 mm to about 5,000 mm, about 50 mm to about 10,000 mm, about 100 mm to about 500 mm, about 100 mm to about 1,000 mm, about 100 mm to about 5,000 mm, about 100 mm to about 10,000 mm, about 500 mm to about 1,000 mm, about 500 mm to about 5,000 mm, about 500 mm to about 10,000 mm, about 1,000 mm to about 5,000 mm, about 1,000 mm to about 10,000 mm, or about 5,000 mm to about 10,000 mm. In some embodiments, a radius of curvature at one or more corners of the viewing window is about 1 mm, about 5 mm, about 10 mm, about 50 mm, about 100 mm, about 500 mm, about 1,000 mm, about 5,000 mm, or about 10,000 mm. In some embodiments, a radius of curvature at one or more corners of the viewing window is at least about 1 mm, about 5 mm, about 10 mm, about 50 mm, about 100 mm, about 500 mm, about 1,000 mm, or about 5,000 mm. In some embodiments, a radius of curvature at one or more corners of the viewing window is at most about 5 mm, about 10 mm, about 50 mm, about 100 mm, about 500 mm, about 1,000 mm, about 5,000 mm, or about 10,000 mm.

In some embodiments, a radius of curvature at one or more longitudinal or transverse edges of the viewing window is about 1 mm to about 100 mm. In some embodiments, a radius of curvature at one or more longitudinal or transverse edges of the viewing window is about 1 mm to about 2 mm, about 1 mm to about 5 mm, about 1 mm to about 10 mm, about 1 mm to about 20 mm, about 1 mm to about 30 mm, about 1 mm to about 40 mm, about 1 mm to about 50 mm, about 1 mm to about 60 mm, about 1 mm to about 80 smm, about 1 mm to about 100 mm, about 2 mm to about 5 mm, about 2 mm to about 10 mm, about 2 mm to about 20 mm, about 2 mm to about 30 mm, about 2 mm to about 40 mm, about 2 mm to about 50 mm, about 2 mm to about 60 mm, about 2 mm to about 80 mm, about 2 mm to about 100 mm, about 5 mm to about 10 mm, about 5 mm to about 20 mm, about 5 mm to about 30 mm, about 5 mm to about 40 mm, about 5 mm to about 50 mm, about 5 mm to about 60 mm, about 5 mm to about 80 mm, about 5 mm to about 100 mm, about 10 mm to about 20 mm, about 10 mm to about 30 mm, about 10 mm to about 40 mm, about 10 mm to about 50 mm, about 10 mm to about 60 mm, about 10 mm to about 80 mm, about 10 mm to about 100 mm, about 20 mm to about 30 mm, about 20 mm to about 40 mm, about 20 mm to about 50 mm, about 20 mm to about 60 mm, about 20 mm to about 80 mm, about 20 mm to about 100 mm, about 30 mm to about 40 mm, about 30 mm to about 50 mm, about 30 mm to about 60 mm, about 30 mm to about 80 mm, about 30 mm to about 100 mm, about 40 mm to about 50 mm, about 40 mm to about 60 mm, about 40 mm to about 80 mm, about 40 mm to about 100 mm, about 50 mm to about 60 mm, about 50 mm to about 80 mm, about 50 mm to about 100 mm, about 60 mm to about 80 mm, about 60 mm to about 100 mm, or about 80 mm to about 100 mm. In some embodiments, a radius of curvature at one or more longitudinal or transverse edges of the viewing window is about 1 mm, about 2 mm, about 5 mm, about 10 mm, about 20 mm, about 30 mm, about 40 mm, about 50 mm, about 60 mm, about 80 mm, or about 100 mm. In some embodiments, a radius of curvature at one or more longitudinal or transverse edges of the viewing window is at least about 1 mm, about 2 mm, about 5 mm, about 10 mm, about 20 mm, about 30 mm, about 40 mm, about 50 mm, about 60 mm, or about 80 mm. In some embodiments, a radius of curvature at one or more longitudinal or transverse edges of the viewing window is at most about 2 mm, about 5 mm, about 10 mm, about 20 mm, about 30 mm, about 40 mm, about 50 mm, about 60 mm, about 80 mm, or about 100 mm.

In some embodiments, the aspect ratio of the viewing window is about 0.2:1 to about 5:1. In some embodiments, the aspect ratio of the viewing window is about 0.2:1 to about 0.3:1, about 0.2:1 to about 0.4:1, about 0.2:1 to about 0.5:1, about 0.2:1 to about 0.7:1, about 0.2:1 to about 0.9:1, about 0.2:1 to about 1:1, about 0.2:1 to about 2:1, about 0.2:1 to about 3:1, about 0.2:1 to about 4:1, about 0.2:1 to about 5:1, about 0.3:1 to about 0.4:1, about 0.3:1 to about 0.5:1, about 0.3:1 to about 0.7:1, about 0.3:1 to about 0.9:1, about 0.3:1 to about 1:1, about 0.3:1 to about 2:1, about 0.3:1 to about 3:1, about 0.3:1 to about 4:1, about 0.3:1 to about 5:1, about 0.4:1 to about 0.5:1, about 0.4:1 to about 0.7:1, about 0.4:1 to about 0.9:1, about 0.4:1 to about 1:1, about 0.4:1 to about 2:1, about 0.4:1 to about 3:1, about 0.4:1 to about 4:1, about 0.4:1 to about 5:1, about 0.5:1 to about 0.7:1, about 0.5:1 to about 0.9:1, about 0.5:1 to about 1:1, about 0.5:1 to about 2:1, about 0.5:1 to about 3:1, about 0.5:1 to about 4:1, about 0.5:1 to about 5:1, about 0.7:1 to about 0.9:1, about 0.7:1 to about 1:1, about 0.7:1 to about 2:1, about 0.7:1 to about 3:1, about 0.7:1 to about 4:1, about 0.7:1 to about 5:1, about 0.9:1 to about 1:1, about 0.9:1 to about 2:1, about 0.9:1 to about 3:1, about 0.9:1 to about 4:1, about 0.9:1 to about 5:1, about 1:1 to about 2:1, about 1:1 to about 3:1, about 1:1 to about 4:1, about 1:1 to about 5:1, about 2:1 to about 3:1, about 2:1 to about 4:1, about 2:1 to about 5:1, about 3:1 to about 4:1, about 3:1 to about 5:1, or about 4:1 to about 5:1. In some embodiments, the aspect ratio of the viewing window is about 0.2:1, about 0.3:1, about 0.4:1, about 0.5:1, about 0.7:1, about 0.9:1, about 1:1, about 2:1, about 3:1, about 4:1, or about 5:1. In some embodiments, the aspect ratio of the viewing window is at least about 0.2:1, about 0.3:1, about 0.4:1, about 0.5:1, about 0.7:1, about 0.9:1, about 1:1, about 2:1, about 3:1, or about 4:1. In some embodiments, the aspect ratio of the viewing window is at most about 0.3:1, about 0.4:1, about 0.5:1, about 0.7:1, about 0.9:1, about 1:1, about 2:1, about 3:1, about 4:1, or about 5:1.

In some embodiments, the shape of the viewing window is not in a form of a regular rectangle, square, circle, or ellipse.

In some embodiments, the predetermined distance of the viewing window is about 1 mm to about 10,000 mm. In some embodiments, the predetermined distance of the viewing window is about 1 mm to about 5 mm, about 1 mm to about 10 mm, about 1 mm to about 50 mm, about 1 mm to about 100 mm, about 1 mm to about 500 mm, about 1 mm to about 1,000 mm, about 1 mm to about 5,000 mm, about 1 mm to about 10,000 mm, about 5 mm to about 10 mm, about 5 mm to about 50 mm, about 5 mm to about 100 mm, about 5 mm to about 500 mm, about 5 mm to about 1,000 mm, about 5 mm to about 5,000 mm, about 5 mm to about 10,000 mm, about 10 mm to about 50 mm, about 10 mm to about 100 mm, about 10 mm to about 500 mm, about 10 mm to about 1,000 mm, about 10 mm to about 5,000 mm, about 10 mm to about 10,000 mm, about 50 mm to about 100 mm, about 50 mm to about 500 mm, about 50 mm to about 1,000 mm, about 50 mm to about 5,000 mm, about 50 mm to about 10,000 mm, about 100 mm to about 500 mm, about 100 mm to about 1,000 mm, about 100 mm to about 5,000 mm, about 100 mm to about 10,000 mm, about 500 mm to about 1,000 mm, about 500 mm to about 5,000 mm, about 500 mm to about 10,000 mm, about 1,000 mm to about 5,000 mm, about 1,000 mm to about 10,000 mm, or about 5,000 mm to about 10,000 mm. In some embodiments, the predetermined distance of the viewing window is about 1 mm, about 5 mm, about 10 mm, about 50 mm, about 100 mm, about 500 mm, about 1,000 mm, about 5,000 mm, or about 10,000 mm. In some embodiments, the predetermined distance of the viewing window is at least about 1 mm, about 5 mm, about 10 mm, about 50 mm, about 100 mm, about 500 mm, about 1,000 mm, or about 5,000 mm. In some embodiments, the predetermined distance of the viewing window is at most about 5 mm, about 10 mm, about 50 mm, about 100 mm, about 500 mm, about 1,000 mm, about 5,000 mm, or about 10,000 mm.

In some embodiments, none of the plurality of content planes is located between the viewing window and the viewer's eye position In some embodiments, the viewing window is defined such that the viewer's field of view (FOV) is encompassed within the viewing window.

In some embodiments, the plurality of different depths are about 1 mm to about 10,000 mm. In some embodiments, the plurality of different depths are about 1 mm to about 5 mm, about 1 mm to about 10 mm, about 1 mm to about 50 mm, about 1 mm to about 100 mm, about 1 mm to about 500 mm, about 1 mm to about 1,000 mm, about 1 mm to about 5,000 mm, about 1 mm to about 10,000 mm, about 5 mm to about 10 mm, about 5 mm to about 50 mm, about 5 mm to about 100 mm, about 5 mm to about 500 mm, about 5 mm to about 1,000 mm, about 5 mm to about 5,000 mm, about 5 mm to about 10,000 mm, about 10 mm to about 50 mm, about 10 mm to about 100 mm, about 10 mm to about 500 mm, about 10 mm to about 1,000 mm, about 10 mm to about 5,000 mm, about 10 mm to about 10,000 mm, about 50 mm to about 100 mm, about 50 mm to about 500 mm, about 50 mm to about 1,000 mm, about 50 mm to about 5,000 mm, about 50 mm to about 10,000 mm, about 100 mm to about 500 mm, about 100 mm to about 1,000 mm, about 100 mm to about 5,000 mm, about 100 mm to about 10,000 mm, about 500 mm to about 1,000 mm, about 500 mm to about 5,000 mm, about 500 mm to about 10,000 mm, about 1,000 mm to about 5,000 mm, about 1,000 mm to about 10,000 mm, or about 5,000 mm to about 10,000 mm. In some embodiments, the plurality of different depths are about 1 mm, about 5 mm, about 10 mm, about 50 mm, about 100 mm, about 500 mm, about 1,000 mm, about 5,000 mm, or about 10,000 mm. In some embodiments, the plurality of different depths are at least about 1 mm, about 5 mm, about 10 mm, about 50 mm, about 100 mm, about 500 mm, about 1,000 mm, or about 5,000 mm. In some embodiments, the plurality of different depths are at most about 5 mm, about 10 mm, about 50 mm, about 100 mm, about 500 mm, about 1,000 mm, about 5,000 mm, or about 10,000 mm.

In some embodiments, the 3D VR media does not comprise 360 degree VR media or 180 degree VR media. In some embodiments, the viewing window does not extend 360 degrees around the VR headset. In some embodiments, the viewing window does not extend 180 degrees around the VR headset. In some embodiments, the viewing window only extends to the viewer's field of view (FOV) around the VR headset as defined by each VR headset.

Another aspect provided herein is a 3-dimensional (3D) virtual reality (VR) media comprising: an viewing window defined at a predetermined distance relative to and in proximity to a viewer's eye position, wherein the viewing window comprises a shape and an aspect ratio that are optimized for the viewer's viewing of the 3D VR media on a VR headset; and a plurality of content planes located at a plurality of different depths relative to the viewing window, wherein the plurality of content planes comprises media content that overlay at the different depths to generate the 3D VR media, and wherein the plurality of content planes are located further away from the viewer's eye position than the viewing window to reduce or eliminate the effects of window violations, thereby enhancing the viewer's viewing and immersivity experience of the 3D VR media on the VR headset.

Another aspect provided herein is a side-by-side mobile device comprising: a right wide sensor; a right medium sensor; a right long sensor; a left wide sensor; a left medium sensor; a left long sensor; a right microphone; and a left microphone; wherein the right wide sensor, the right medium sensor, the right long sensor, the left wide sensor, the left medium sensor, the left long sensor, or any combination thereof capture a three-dimensional media.

In some embodiments, a distance between the center-points of the right wide sensor and the left wide sensor, the right medium sensor and the left medium sensor, the right long sensor and the left long sensor or any combination thereof is between about 0.25 inches to about 600 inches. In some embodiments, a distance between the centerpoints of the right wide sensor and the left wide sensor, the right medium sensor and the left medium sensor, the right long sensor and the left long sensor or any combination thereof is between about 0.25 inches to about 0.5 inches, about 0.25 inches to about 1 inch, about 0.25 inches to about 5 inches, about 0.25 inches to about 10 inches, about 0.25 inches to about 25 inches, about 0.25 inches to about 50 inches, about 0.25 inches to about 100 inches, about 0.25 inches to about 200 inches, about 0.25 inches to about 400 inches, about 0.25 inches to about 600 inches, about 0.5 inches to about 1 inch, about 0.5 inches to about 5 inches, about 0.5 inches to about 10 inches, about 0.5 inches to about 25 inches, about 0.5 inches to about 50 inches, about 0.5 inches to about 100 inches, about 0.5 inches to about 200 inches, about 0.5 inches to about 400 inches, about 0.5 inches to about 600 inches, about 1 inch to about 5 inches, about 1 inch to about 10 inches, about 1 inch to about 25 inches, about 1 inch to about 50 inches, about 1 inch to about 100 inches, about 1 inch to about 200 inches, about 1 inch to about 400 inches, about 1 inch to about 600 inches, about 5 inches to about 10 inches, about 5 inches to about 25 inches, about 5 inches to about 50 inches, about 5 inches to about 100 inches, about 5 inches to about 200 inches, about 5 inches to about 400 inches, about 5 inches to about 600 inches, about 10 inches to about 25 inches, about 10 inches to about 50 inches, about 10 inches to about 100 inches, about 10 inches to about 200 inches, about 10 inches to about 400 inches, about 10 inches to about 600 inches, about 25 inches to about 50 inches, about 25 inches to about 100 inches, about 25 inches to about 200 inches, about 25 inches to about 400 inches, about 25 inches to about 600 inches, about 50 inches to about 100 inches, about 50 inches to about 200 inches, about 50 inches to about 400 inches, about 50 inches to about 600 inches, about 100 inches to about 200 inches, about 100 inches to about 400 inches, about 100 inches to about 600 inches, about 200 inches to about 400 inches, about 200 inches to about 600 inches, or about 400 inches to about 600 inches, including increments therein. In some embodiments, a distance between the centerpoints of the right wide sensor and the left wide sensor, the right medium sensor and the left medium sensor, the right long sensor and the left long sensor or any combination thereof is between about 0.25 inches, about 0.5 inches, about 1 inch, about 5 inches, about 10 inches, about 25 inches, about 50 inches, about 100 inches, about 200 inches, about 400 inches, or about 600 inches. In some embodiments, a distance between the centerpoints of the right wide sensor and the left wide sensor, the right medium sensor and the left medium sensor, the right long sensor and the left long sensor or any combination thereof is between at least about 0.25 inches, about 0.5 inches, about 1 inch, about 5 inches, about 10 inches, about 25 inches, about 50 inches, about 100 inches, about 200 inches, or about 400 inches. In some embodiments, a distance between the centerpoints of the right wide sensor and the left wide sensor, the right medium sensor and the left medium sensor, the right long sensor and the left long sensor or any combination thereof is between at most about 0.5 inches, about 1 inch, about 5 inches, about 10 inches, about 25 inches, about 50 inches, about 100 inches, about 200 inches, about 400 inches, or about 600 inches.

In some embodiments, a distance between the centerpoints of the right wide sensor and the left wide sensor, the right medium sensor and the left medium sensor, the right long sensor and the left long sensor or any combination thereof is adjustable between about 0.25 inches to about 600 inches. In some embodiments, a distance between the centerpoints of the right wide sensor and the left wide sensor, the right medium sensor and the left medium sensor, the right long sensor and the left long sensor or any combination thereof is adjustable between about 0.25 inches to about 0.5 inches, about 0.25 inches to about 1 inch, about 0.25 inches to about 5 inches, about 0.25 inches to about 10 inches, about 0.25 inches to about 25 inches, about 0.25 inches to about 50 inches, about 0.25 inches to about 100 inches, about 0.25 inches to about 200 inches, about 0.25 inches to about 400 inches, about 0.25 inches to about 600 inches, about 0.5 inches to about 1 inch, about 0.5 inches to about 5 inches, about 0.5 inches to about 10 inches, about 0.5 inches to about 25 inches, about 0.5 inches to about 50 inches, about 0.5 inches to about 100 inches, about 0.5 inches to about 200 inches, about 0.5 inches to about 400 inches, about 0.5 inches to about 600 inches, about 1 inch to about 5 inches, about 1 inch to about 10 inches, about 1 inch to about 25 inches, about 1 inch to about 50 inches, about 1 inch to about 100 inches, about 1 inch to about 200 inches, about 1 inch to about 400 inches, about 1 inch to about 600 inches, about 5 inches to about 10 inches, about 5 inches to about 25 inches, about 5 inches to about 50 inches, about 5 inches to about 100 inches, about 5 inches to about 200 inches, about 5 inches to about 400 inches, about 5 inches to about 600 inches, about 10 inches to about 25 inches, about 10 inches to about 50 inches, about 10 inches to about 100 inches, about 10 inches to about 200 inches, about 10 inches to about 400 inches, about 10 inches to about 600 inches, about 25 inches to about 50 inches, about 25 inches to about 100 inches, about 25 inches to about 200 inches, about 25 inches to about 400 inches, about 25 inches to about 600 inches, about 50 inches to about 100 inches, about 50 inches to about 200 inches, about 50 inches to about 400 inches, about 50 inches to about 600 inches, about 100 inches to about 200 inches, about 100 inches to about 400 inches, about 100 inches to about 600 inches, about 200 inches to about 400 inches, about 200 inches to about 600 inches, or about 400 inches to about 600 inches, including increments therein. In some embodiments, a distance between the centerpoints of the right wide sensor and the left wide sensor, the right medium sensor and the left medium sensor, the right long sensor and the left long sensor or any combination thereof is adjustable between about 0.25 inches, about 0.5 inches, about 1 inch, about 5 inches, about 10 inches, about 25 inches, about 50 inches, about 100 inches, about 200 inches, about 400 inches, or about 600 inches. In some embodiments, a distance between the centerpoints of the right wide sensor and the left wide sensor, the right medium sensor and the left medium sensor, the right long sensor and the left long sensor or any combination thereof is adjustable between at least about 0.25 inches, about 0.5 inches, about 1 inch, about 5 inches, about 10 inches, about 25 inches, about 50 inches, about 100 inches, about 200 inches, or about 400 inches. In some embodiments, a distance between the centerpoints of the right wide sensor and the left wide sensor, the right medium sensor and the left medium sensor, the right long sensor and the left long sensor or any combination thereof is adjustable between at most about 0.5 inches, about 1 inch, about 5 inches, about 10 inches, about 25 inches, about 50 inches, about 100 inches, about 200 inches, about 400 inches, or about 600 inches.

Another aspect provided herein is a computer-implemented method of implementing a unidirectional immersive three-dimensional video comprising: receiving: receiving: an immersive three-dimensional video; a directional input for a location of the immersive three-dimensional video; an accelerometer measurement; and a see-through camera image of a virtual reality headset; determining a relative orientation angle between the directional input and a viewing direction of the virtual reality headset, about one or more axis; displaying, on a screen of the virtual reality headset, the immersive three-dimensional video when the relative orientation angle is within a set angle; and displaying, on the screen of the virtual reality headset, the see-through camera image when the relative orientation angle is greater than the set angle.

In some embodiments, the set angle is about 60 degrees to about 180 degrees. In some embodiments, the set angle is about 60 degrees to about 80 degrees, about 60 degrees to about 100 degrees, about 60 degrees to about 120 degrees, about 60 degrees to about 140 degrees, about 60 degrees to about 160 degrees, about 60 degrees to about 180 degrees, about 80 degrees to about 100 degrees, about 80 degrees to about 120 degrees, about 80 degrees to about 140 degrees, about 80 degrees to about 160 degrees, about 80 degrees to about 180 degrees, about 100 degrees to about 120 degrees, about 100 degrees to about 140 degrees, about 100 degrees to about 160 degrees, about 100 degrees to about 180 degrees, about 120 degrees to about 140 degrees, about 120 degrees to about 160 degrees, about 120 degrees to about 180 degrees, about 140 degrees to about 160 degrees, about 140 degrees to about 180 degrees, or about 160 degrees to about 180 degrees, including increments therein. In some embodiments, the set angle is about 60 degrees, about 80 degrees, about 100 degrees, about 120 degrees, about 140 degrees, about 160 degrees, or about 180 degrees. In some embodiments, the set angle is at least about 60 degrees, about 80 degrees, about 100 degrees, about 120 degrees, about 140 degrees, or about 160 degrees. In some embodiments, the set angle is at most about 80 degrees, about 100 degrees, about 120 degrees, about 140 degrees, about 160 degrees, or about 180 degrees.

In some embodiments, the method further comprises fading the immersive three-dimensional video, the see-through camera image, or both, when the relative orientation angle is within a threshold from the set angle. In some embodiments, the threshold is about 5 degrees to about 30 degrees. In some embodiments, the threshold is about 5 degrees to about 10 degrees, about 5 degrees to about 15 degrees, about 5 degrees to about 20 degrees, about 5 degrees to about 25 degrees, about 5 degrees to about 30 degrees, about 10 degrees to about 15 degrees, about 10 degrees to about 20 degrees, about 10 degrees to about 25 degrees, about 10 degrees to about 30 degrees, about 15 degrees to about 20 degrees, about 15 degrees to about 25 degrees, about 15 degrees to about 30 degrees, about 20 degrees to about 25 degrees, about 20 degrees to about 30 degrees, or about 25 degrees to about 30 degrees, including increments therein. In some embodiments, the threshold is about 5 degrees, about 10 degrees, about 15 degrees, about 20 degrees, about 25 degrees, or about 30 degrees. In some embodiments, the threshold is at least about 5 degrees, about 10 degrees, about 15 degrees, about 20 degrees, or about 25 degrees. In some embodiments, the threshold is at most about 10 degrees, about 15 degrees, about 20 degrees, about 25 degrees, or about 30 degrees.

Another aspect provided herein is a computer-implemented system comprising: a digital processing device comprising: at least one processor, an operating system configured to perform executable instructions, a memory, and a computer program including instructions executable by the digital processing device to create an application which performs at least the following: receiving: receiving: an immersive three-dimensional video; a directional input for a location of the immersive three-dimensional video; an accelerometer measurement; and a see-through camera image of a virtual reality headset; determining a relative orientation angle between the directional input and a viewing direction of the virtual reality headset, about one or more axis; displaying, on a screen of the virtual reality headset, the immersive three-dimensional video when the relative orientation angle is within a set angle; and displaying, on the screen of the virtual reality headset, the see-through camera image when the relative orientation angle is greater than the set angle.

In some embodiments, the set angle is about 60 degrees to about 180 degrees. In some embodiments, the set angle is about 60 degrees to about 80 degrees, about 60 degrees to about 100 degrees, about 60 degrees to about 120 degrees, about 60 degrees to about 140 degrees, about 60 degrees to about 160 degrees, about 60 degrees to about 180 degrees, about 80 degrees to about 100 degrees, about 80 degrees to about 120 degrees, about 80 degrees to about 140 degrees, about 80 degrees to about 160 degrees, about 80 degrees to about 180 degrees, about 100 degrees to about 120 degrees, about 100 degrees to about 140 degrees, about 100 degrees to about 160 degrees, about 100 degrees to about 180 degrees, about 120 degrees to about 140 degrees, about 120 degrees to about 160 degrees, about 120 degrees to about 180 degrees, about 140 degrees to about 160 degrees, about 140 degrees to about 180 degrees, or about 160 degrees to about 180 degrees, including increments therein. In some embodiments, the set angle is about 60 degrees, about 80 degrees, about 100 degrees, about 120 degrees, about 140 degrees, about 160 degrees, or about 180 degrees. In some embodiments, the set angle is at least about 60 degrees, about 80 degrees, about 100 degrees, about 120 degrees, about 140 degrees, or about 160 degrees. In some embodiments, the set angle is at most about 80 degrees, about 100 degrees, about 120 degrees, about 140 degrees, about 160 degrees, or about 180 degrees.

In some embodiments, the application further performs fading the immersive three-dimensional video, the see-through camera image, or both, when the relative orientation angle is within a threshold from the set angle. In some embodiments, the threshold is about 5 degrees to about 30 degrees. In some embodiments, the threshold is about 5 degrees to about 10 degrees, about 5 degrees to about 15 degrees, about 5 degrees to about 20 degrees, about 5 degrees to about 25 degrees, about 5 degrees to about 30 degrees, about 10 degrees to about 15 degrees, about 10 degrees to about 20 degrees, about 10 degrees to about 25 degrees, about 10 degrees to about 30 degrees, about 15 degrees to about 20 degrees, about 15 degrees to about 25 degrees, about 15 degrees to about 30 degrees, about 20 degrees to about 25 degrees, about 20 degrees to about 30 degrees, or about 25 degrees to about 30 degrees, including increments therein. In some embodiments, the threshold is about 5 degrees, about 10 degrees, about 15 degrees, about 20 degrees, about 25 degrees, or about 30 degrees. In some embodiments, the threshold is at least about 5 degrees, about 10 degrees, about 15 degrees, about 20 degrees, or about 25 degrees. In some embodiments, the threshold is at most about 10 degrees, about 15 degrees, about 20 degrees, about 25 degrees, or about 30 degrees.

Another aspect provided herein is a non-transitory computer-readable storage media encoded with a computer program including instructions executable by a processor to create an application performing at least the following:

receiving: receiving: an immersive three-dimensional video; a directional input for a location of the immersive three-dimensional video; an accelerometer measurement; and a see-through camera image of a virtual reality headset; determining a relative orientation angle between the directional input and a viewing direction of the virtual reality headset, about one or more axis; displaying, on a screen of the virtual reality headset, the immersive three-dimensional video when the relative orientation angle is within a set angle; and displaying, on the screen of the virtual reality headset, the see-through camera image when the relative orientation angle is greater than the set angle.

In some embodiments, the set angle is about 60 degrees to about 180 degrees. In some embodiments, the set angle is about 60 degrees to about 80 degrees, about 60 degrees to about 100 degrees, about 60 degrees to about 120 degrees, about 60 degrees to about 140 degrees, about 60 degrees to about 160 degrees, about 60 degrees to about 180 degrees, about 80 degrees to about 100 degrees, about 80 degrees to about 120 degrees, about 80 degrees to about 140 degrees, about 80 degrees to about 160 degrees, about 80 degrees to about 180 degrees, about 100 degrees to about 120 degrees, about 100 degrees to about 140 degrees, about 100 degrees to about 160 degrees, about 100 degrees to about 180 degrees, about 120 degrees to about 140 degrees, about 120 degrees to about 160 degrees, about 120 degrees to about 180 degrees, about 140 degrees to about 160 degrees, about 140 degrees to about 180 degrees, or about 160 degrees to about 180 degrees, including increments therein. In some embodiments, the set angle is about 60 degrees, about 80 degrees, about 100 degrees, about 120 degrees, about 140 degrees, about 160 degrees, or about 180 degrees. In some embodiments, the set angle is at least about 60 degrees, about 80 degrees, about 100 degrees, about 120 degrees, about 140 degrees, or about 160 degrees. In some embodiments, the set angle is at most about 80 degrees, about 100 degrees, about 120 degrees, about 140 degrees, about 160 degrees, or about 180 degrees.

In some embodiments, the application further performs fading the immersive three-dimensional video, the see-through camera image, or both, when the relative orientation angle is within a threshold from the set angle. In some embodiments, the threshold is about 5 degrees to about 30 degrees. In some embodiments, the threshold is about 5 degrees to about 10 degrees, about 5 degrees to about 15 degrees, about 5 degrees to about 20 degrees, about 5 degrees to about 25 degrees, about 5 degrees to about 30 degrees, about 10 degrees to about 15 degrees, about 10 degrees to about 20 degrees, about 10 degrees to about 25 degrees, about 10 degrees to about 30 degrees, about 15 degrees to about 20 degrees, about 15 degrees to about 25 degrees, about 15 degrees to about 30 degrees, about 20 degrees to about 25 degrees, about 20 degrees to about 30 degrees, or about 25 degrees to about 30 degrees, including increments therein. In some embodiments, the threshold is about 5 degrees, about 10 degrees, about 15 degrees, about 20 degrees, about 25 degrees, or about 30 degrees. In some embodiments, the threshold is at least about 5 degrees, about 10 degrees, about 15 degrees, about 20 degrees, or about 25 degrees. In some embodiments, the threshold is at most about 10 degrees, about 15 degrees, about 20 degrees, about 25 degrees, or about 30 degrees.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

A content plane of a two or three-dimensional media is defined as a two or three-dimensional surface upon which the media appears. Additionally, a viewing window of a two or three-dimensional media is defined as a two-dimensional surface upon which the media is actually emitted.

Standard Two-Dimensional Media

Figure 1A:
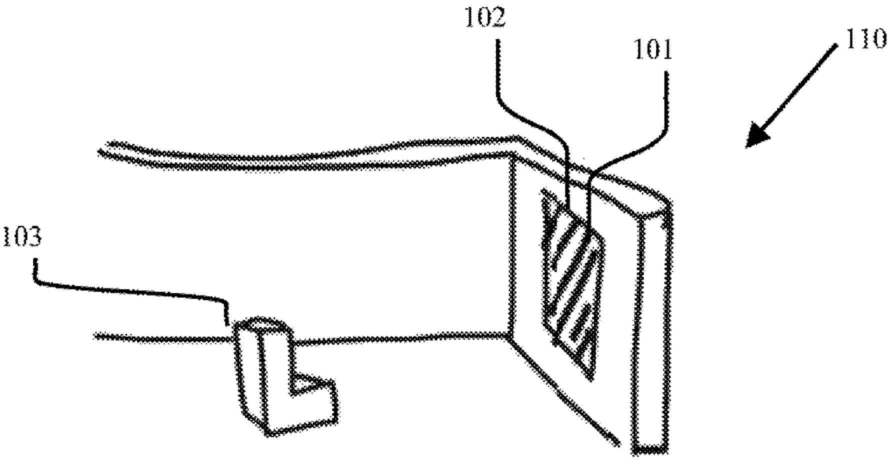
FIG. 1A shows a non-limiting diagram of a content plane and viewing window for a standard two-dimensional media.
Figure 2A:
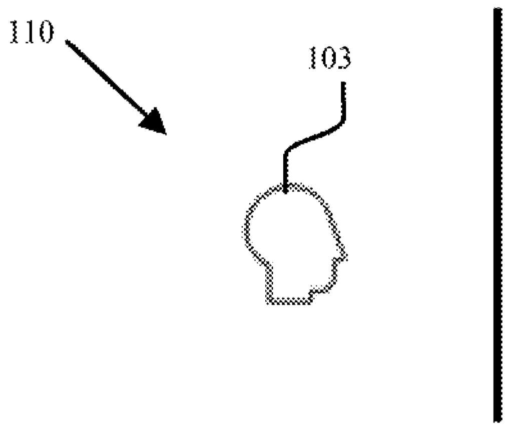
FIG. 2A shows a non-limiting diagram of the screen size and position relative to a viewer for a standard two-dimensional media.

For a standard two-dimensional media 110 per FIG. 1A the content plane 101 and the viewing window 102 are coplanar, as the content of a two-dimensional media can only appear to be located on the surface from which the content is emitted. Non-limiting examples of standard two-dimensional media 110 include static pictures, and dynamic television screens or monitors. Another exemplary diagram of a standard two-dimensional media 110 is shown in FIG. 2A.

Figure 3A:
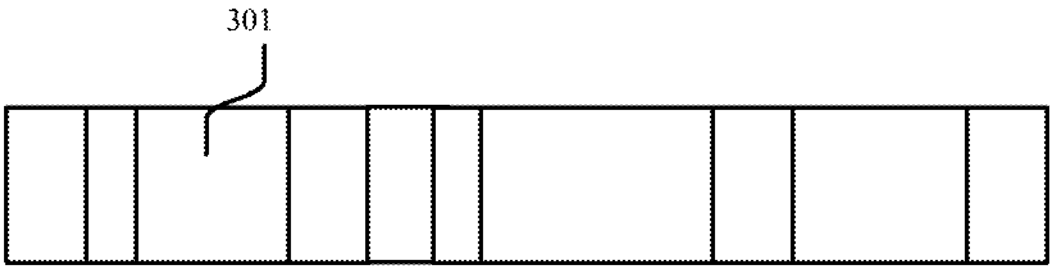
FIG. 3A shows a non-limiting diagram of a film editing timeline for a standard two-dimensional media.

While film editing to create a sequence of two-dimensional media scenes 301 per FIG. 3A, is well known and effective, such two-dimensional media lacks the immersiveness of head-mounted three-dimensional media.

Standard Three-Dimensional Media

Figure 1B:
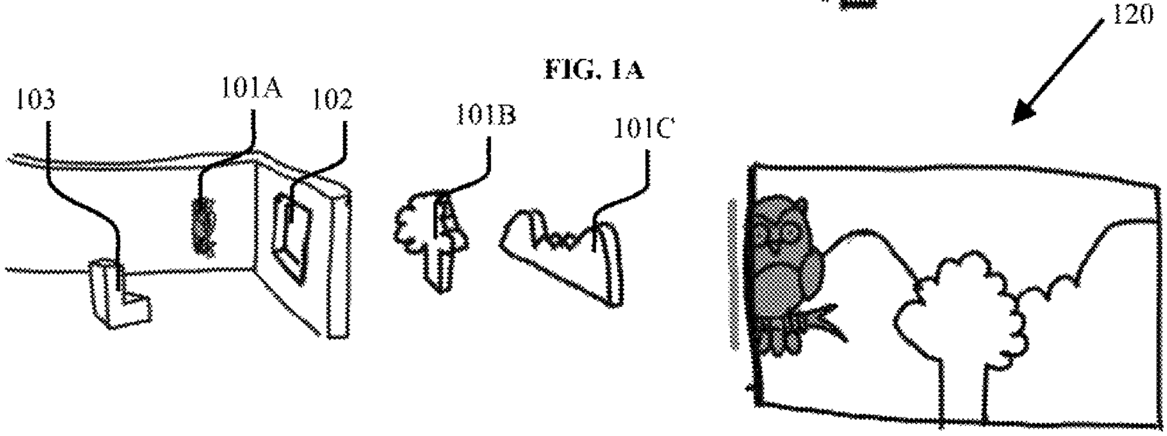
FIG. 1B shows a non-limiting diagram of a content plane and viewing window for a standard three-dimensional media.

Standard three-dimensional media 120, per FIG. 1B, is captured simultaneously by two or more cameras. The images captured by each camera are overlaid or shown sequentially such that the media appears to be three-dimensional. Non-limiting examples of standard 360 and 180 degree three-dimensional media are three-dimensional televisions and virtual reality headsets.

Figure 2B:
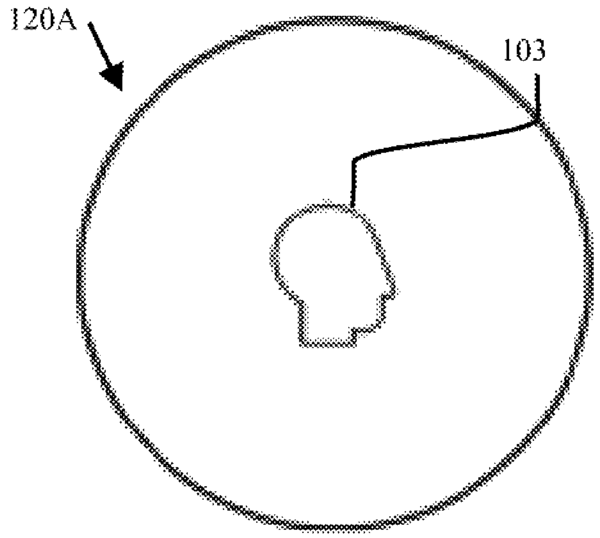
FIG. 2B shows a non-limiting diagram of the screen size and position relative to a viewer for a standard 360 degree virtual reality three-dimensional media.
Figure 2C:
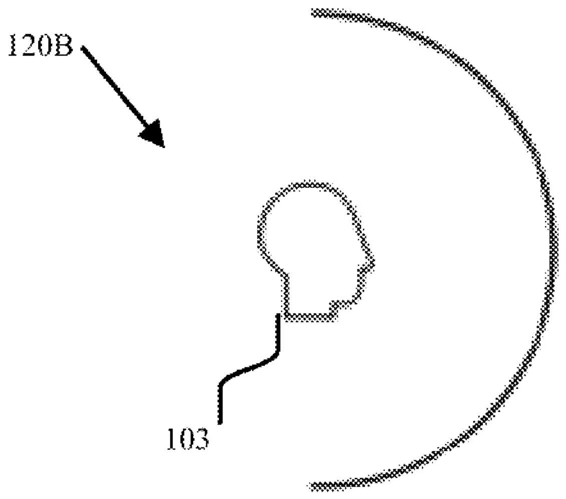
FIG. 2C shows a non-limiting diagram of the screen size and position relative to a viewer for a standard 180 degree virtual reality three-dimensional media.
Figure 3B:
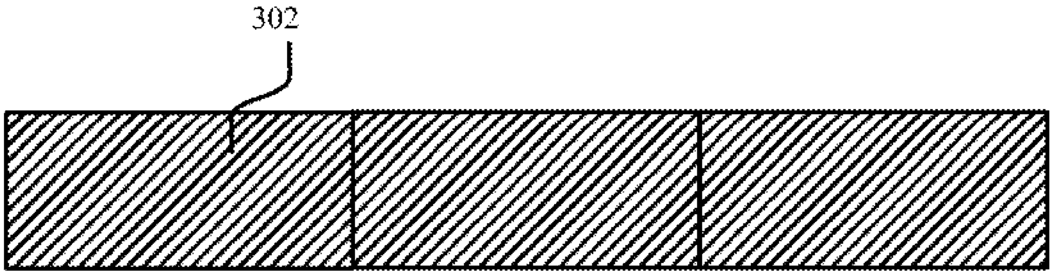
FIG. 3B shows a non-limiting diagram of a film editing timeline for a standard virtual reality three-dimensional media.
Figure 3C:
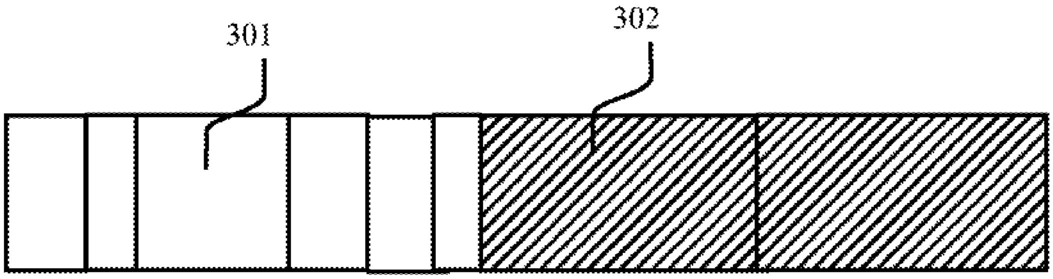
FIG. 3C shows a non-limiting diagram a film editing timeline for a standard virtual reality of sequential two-dimensional and three-dimensional media.

A 360 degree three-dimensional media 120A, per FIG. 2B, provides media to all sides of the viewer's 103 face in a sphere. A 180 degree three-dimensional media 120B provides media to only the front half of the viewer's 103 face. While 360 and 180 degree three-dimensional media 120A 120B enable increased viewer immersion, transitions between scenes with such media can be jarring. Thus, such media is often limited to passive ambient experiences with only three-dimensional media scenes 302, per FIG. 3B, or to a plurality of three-dimensional media scenes 302 followed or preceded by a sequestered plurality of two-dimensional media scenes 301, per FIG. 3C. Further, the number of scene transitions for such three-dimensional media are limited to reduce the associated jarring experiences. In some embodiments, the 360 and 180 degree three-dimensional media 120A 120B herein are not cropped or diminished.

Figure 5:
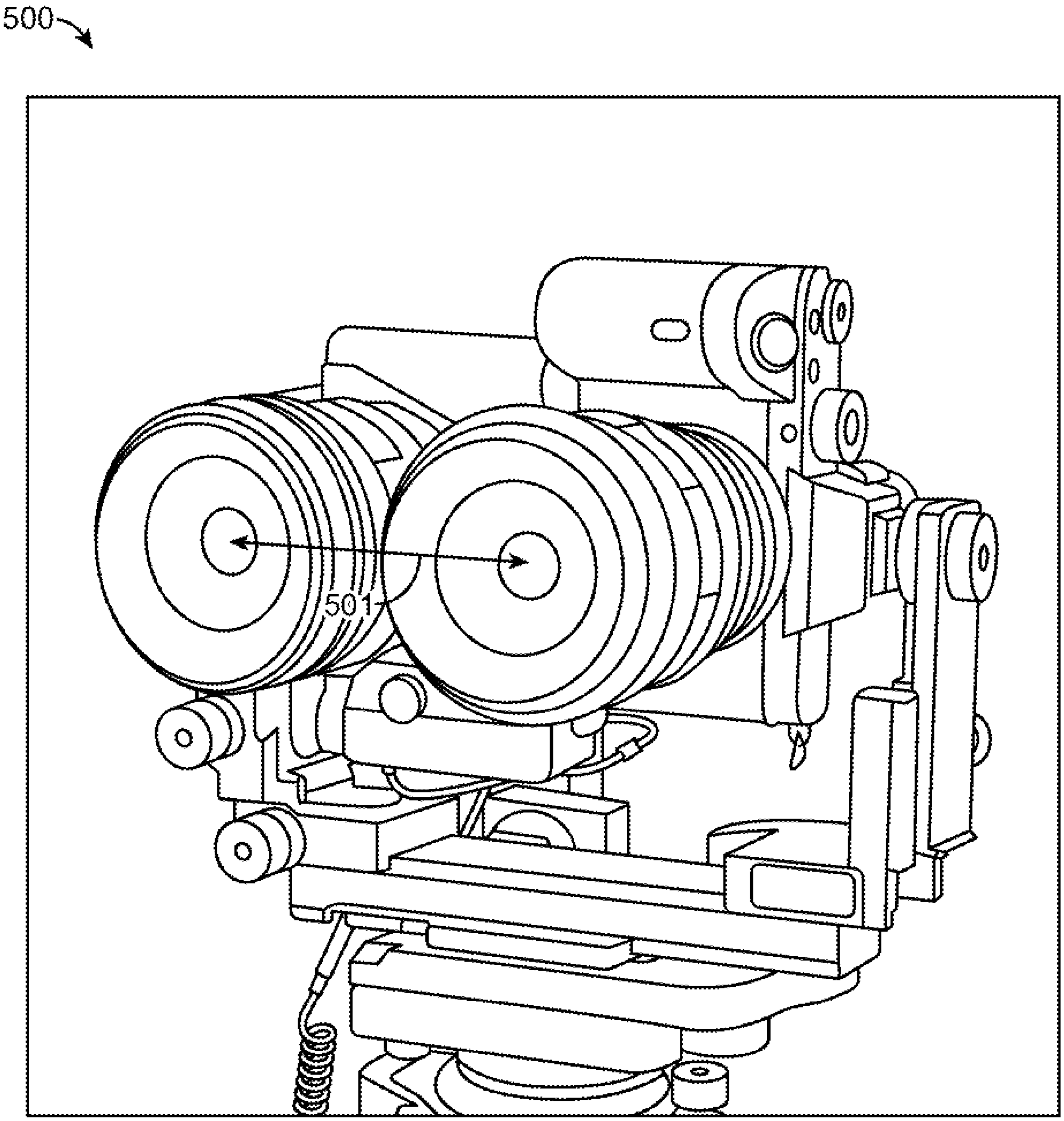
FIG. 5 shows a non-limiting exemplary image of a first system for capturing a three-dimensional video, per an embodiment herein.

Such media can be captured by a side-by-side array of cameras 500, per FIG. 5. For a side-by-side array of cameras 500 a separation distance 501 between the two or more cameras is generally equivalent to the average distance between human eyes, wherein images captured by a first camera represents an image seen from a first human eye, and wherein images captured by a second camera represents an image seen from a second human eye. While side-by-side array of cameras 500 can capture images with large interaxial separation, the minimum focal length is limited by minimum interaxial separation 501 between the two or more cameras, as dictated by the diameters of the lenses of the cameras.

Figure 12A:
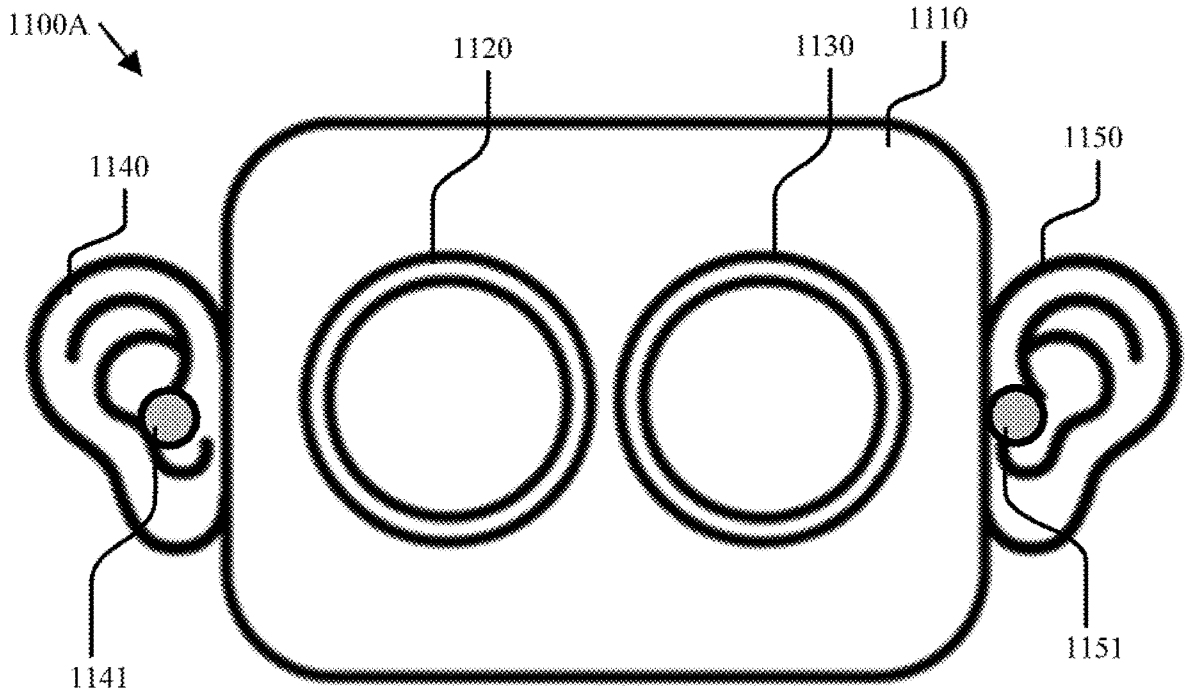
FIG. 12A shows a non-limiting front-view illustration of a side-by-side rig, per an embodiment herein.

FIG. 12A shows a non-limiting front-view illustration of a side-by-side camera rig 1200A. In some embodiments, as shown, the side-by-side rig 1200A comprises a housing 1210, a right camera attachment 1220 within the housing 1210, a left camera attachment 1230 within the housing, a right ear model 1240 coupled to the left side of the housing 1210, a right microphone 1241 within the right ear model 1240, a left ear model 1250 coupled to the left side of the housing 1210, and a left microphone 1251 within the left ear model 1250. In some embodiments, a centerpoint of the right camera attachment 1220 and a centerpoint of the left camera attachment 1230 are separated by about 0.25 inches to about 600 inches. In some embodiments, a distance between the centerpoints of the right camera attachment 1220 and the left camera attachment 1230 is adjustable between about 0.25 inches to about 600 inches.

In some embodiments, the housing 1210 further comprises a fastener that enables the side-by-side camera rig 1200A to mount to a tripod, stabilization rig, or any other surface/object. In some embodiments, the fastener is a female threaded feature. In some embodiments, the side-by-side camera rig 1200A further comprises a monitor, a monitor connection, a VR headset connection, a Wi-Fi connection, a Bluetooth connection, or any combination thereof to enable instant playback.

Figure 12B:
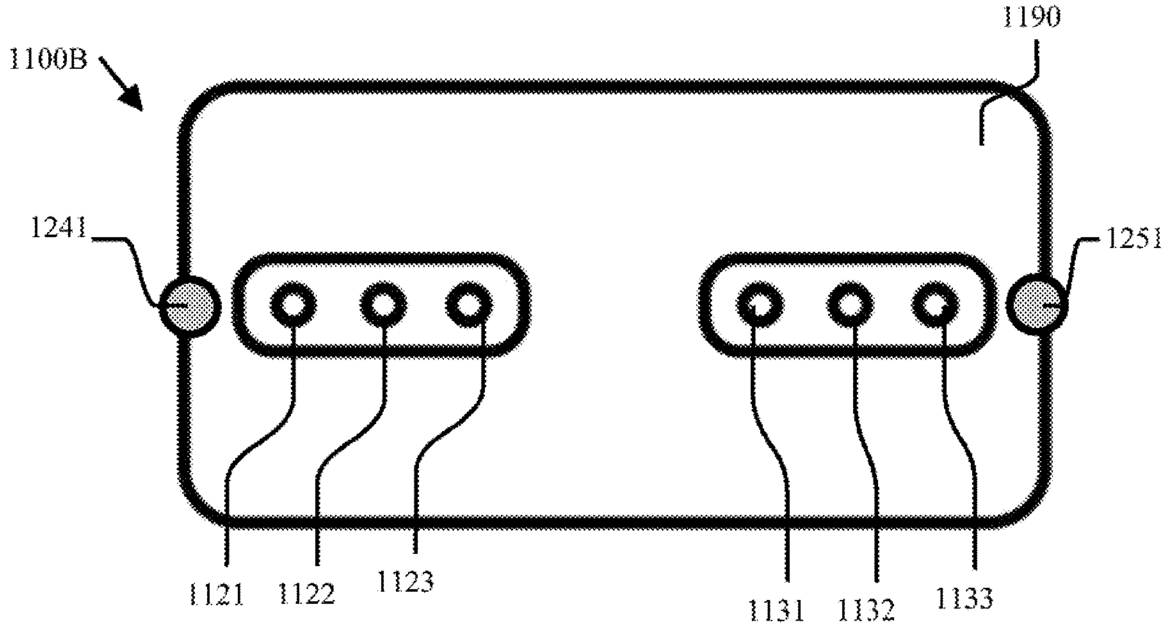
FIG. 12B shows a non-limiting front-view illustration of a mobile side-by-side rig, per an embodiment herein.

FIG. 12B shows a non-limiting front-view illustration of a mobile side-by-side camera device 1200B. In some embodiments, as shown, the mobile side-by-side rig 1200B comprises a right wide sensor 1221, a right medium sensor 1222, and a right long sensor 1223, a left wide sensor 1231, a left medium sensor 1232, a left long sensor 1233, a right microphone 1241, and a left microphone 1251. In some embodiments, as shown, the right medium sensor 1222 is situated between the right wide sensor 1221 and the right long sensor 1223, and the left medium sensor 1232 is position between the left wide sensor 1231 and the left long sensor 1233. Alternatively, in some embodiments, the right wide sensor 1221 is situated between the right medium sensor 1222 and the right long sensor 1223, and the left wide sensor 1231 is position between the medium wide sensor 1232 and the left long sensor 1233. In some embodiments, as shown, the right long sensor 1223 is situated between the right wide sensor 1221 and the right medium sensor 1222, and the left long sensor 1233 is position between the left wide sensor 1231 and the left medium sensor 1232. In some embodiments, the mobile side-by-side rig 1200B is a cellphone, a smartphone, or a tablet. In some embodiments, the mobile side-by-side rig 1200B is a modified cellphone, a smartphone, or a tablet.

In some embodiments, a centerpoint of the right wide sensor 1221, and a centerpoint of the left wide sensor 1231 are separated by about 0.25 inches to about 600 inches. In some embodiments, a centerpoint of the right medium sensor 1222 and a centerpoint of the left medium sensor 1232 are separated by about 0.25 inches to about 600 inches. In some embodiments, a centerpoint of the right long sensor 1223 and a centerpoint of the left long sensor 1233 are separated by about 0.25 inches to about 600 inches. In some embodiments, a distance between the centerpoints of the right wide sensor 1221 and the left wide sensor 1231 is adjustable between about 0.25 inches to about 600 inches. In some embodiments, a distance between the centerpoints of the right medium sensor 1222 and the left medium sensor 1232 is adjustable between about 0.25 inches to about 600 inches. In some embodiments, a distance between the centerpoints of the right long sensor 1223 and the left long sensor 1233 is adjustable between about 0.25 inches to about 600 inches.

In some embodiments, virtual reality goggles configured to view images captured by the side-by-side camera rig 1200 has an ocular distance of about 1.5 inches to about 3.4 inches. In some embodiments, virtual reality goggles configured to view images captured by the side-by-side camera rig 1200 has an ocular distance that corresponds to a distance between centerpoints of the right camera attachment 1220 and the left camera attachment 1230, the right wide sensor 1221 and the wide sensor 1231 the right medium sensor 1222 and the left medium sensor 1232, the right long sensor 1223 and the left long sensor 1233 or any combination thereof.

In some embodiments, the right ear model 1240, the left ear model 1250, or both are formed of silicone, rubber, or any other material capable of replicating the acoustic properties of human ears. In some embodiments, the right ear model 1240, the right microphone 1241 the left ear model 1250 and the left microphone 1251 enable the side-by-side camera rig 1200 to capture binaural sound.

In some embodiments, the relative position between the right camera attachment 1220, the left camera attachment 1230, the right wide sensor 1221, the right medium sensor 1222, the right long sensor 1223, the left wide sensor 1231, the left medium sensor 1232, the left long sensor 1233, the right ear model 1240, the right microphone 1241, the left ear model 1250, the left microphone 1251, or any combination thereof enable the side-by-side camera rig 1200 to capture both binaural audio and three-dimensional video in a single device to capture a fully immersive virtual experience.

Figure 6B:
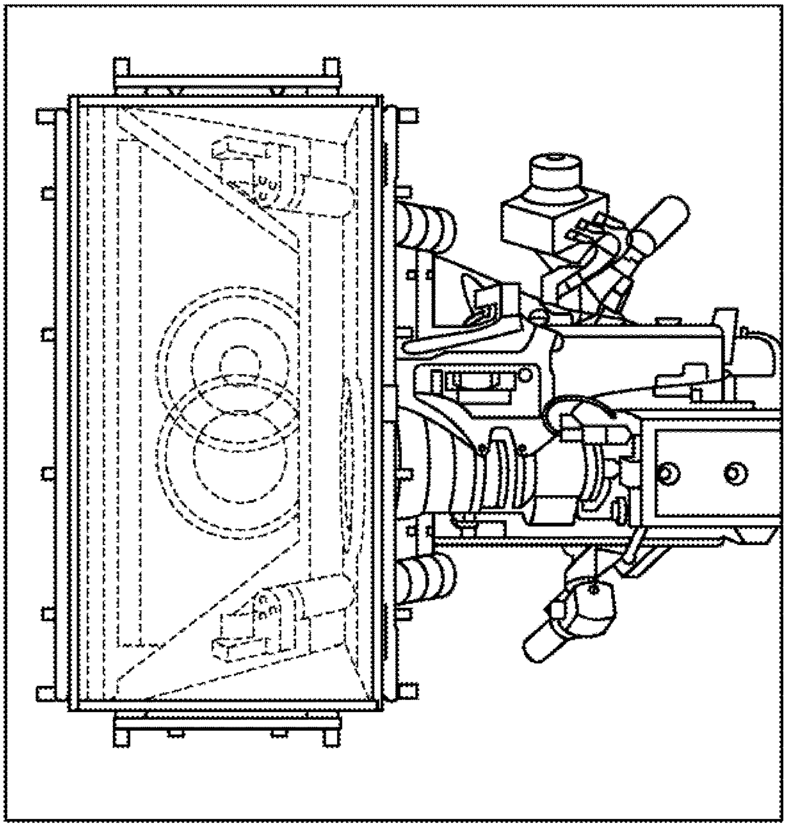
FIG. 6B shows a second angle of a non-limiting exemplary image of a preceding second system for capturing a three-dimensional video, per an embodiment herein.
Figure 6A:
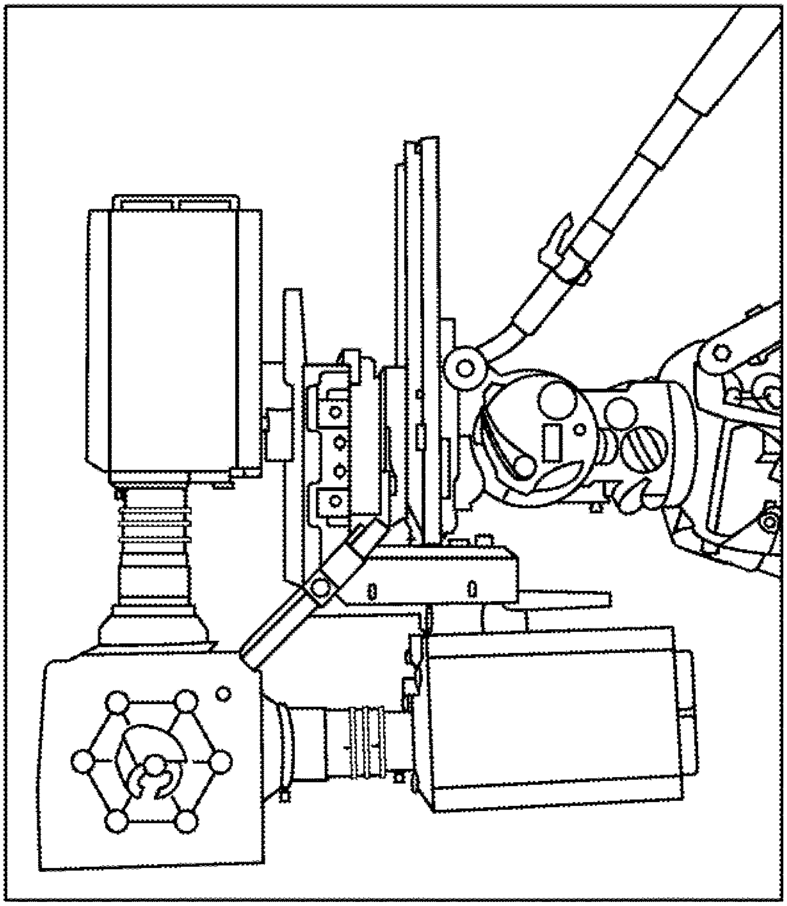
FIG. 6A shows a non-limiting exemplary image of a second system for capturing a three-dimensional video, per an embodiment herein.
Figure 8:
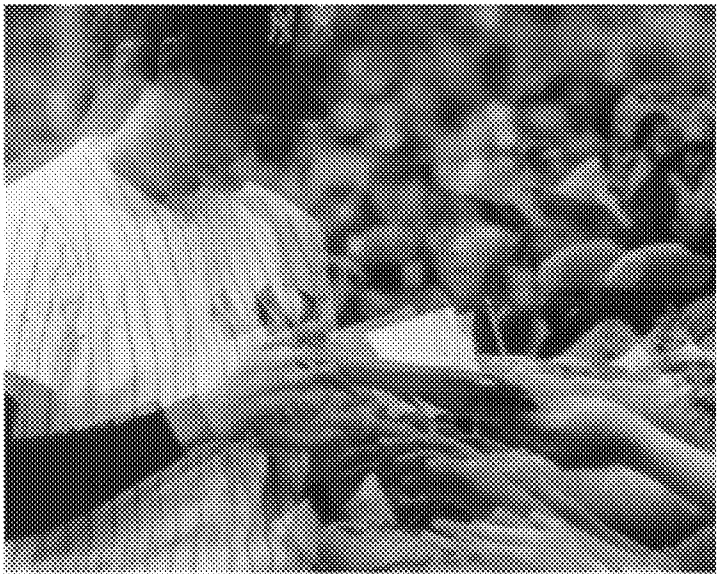
FIG. 8 shows a non-limiting example of superimposed images captured by a beam splitter rig with a 50 mm lens, per an embodiment herein.
Figure 9:
FIG. 9 shows a non-limiting example of an image captured with an exposed mirror box by a beam splitter rig with a 24 mm lens, per an embodiment herein.

Alternatively, such media can be captured by a beam-splitter array 600, per FIGS. 6A and 6B. Such beam-splitter arrays 600 align the cameras perpendicularly and employ a 50-50 mirror incident to each camera at 45 degrees, to redirect captured light such that the minimum focal length is not dictated by the diameters of the lenses of the cameras. However, the arrangement of the one or more mirrors limits the maximum focal lengths. Further, the mirrors within such beam-splitter array 600 often form lens flares that disturb the captured image. Additionally, the beam splitter rig has a minimum focal distance, wherein focal lengths below a set value expose mirror box within the beam-splitter array. FIG. 8 shows a non-limiting example of superimposed images captured by a beam splitter rig with a 50 mm lens. FIG. 9 shows a non-limiting example of an image captured with an exposed mirror box by a beam splitter rig with a 24 mm lens.

For a standard three-dimensional media 120 per FIG. 1B a distance between the viewer 103 and the viewing window 102 is often limited by the distance between the first and second cameras. Such standard three-dimensional media 120 employ several layered content planes 101A 101B 101C, each content plane appearing at a certain distance from the viewer 103. Some standard three-dimensional media 120 comprise one or more content planes 101A between the viewer 103 and the viewing window 102 and one or more content planes 101B 101C behind the viewing window 102 with respect to the viewer 103. However, as the viewing window 102 for standard three-dimensional media 120 is fixed, the content on any content plane 101A between the viewer 103 and the viewing window 102 can be occluded by the limits of the viewing window 102 and cause a window violations. While the multiple layered content planes 101A 101B 101C enhance the reality and life-likeness of three-dimensional media, such window violations distract from such benefits and prevents the presentation of media close to the viewer.

Figure 11A:
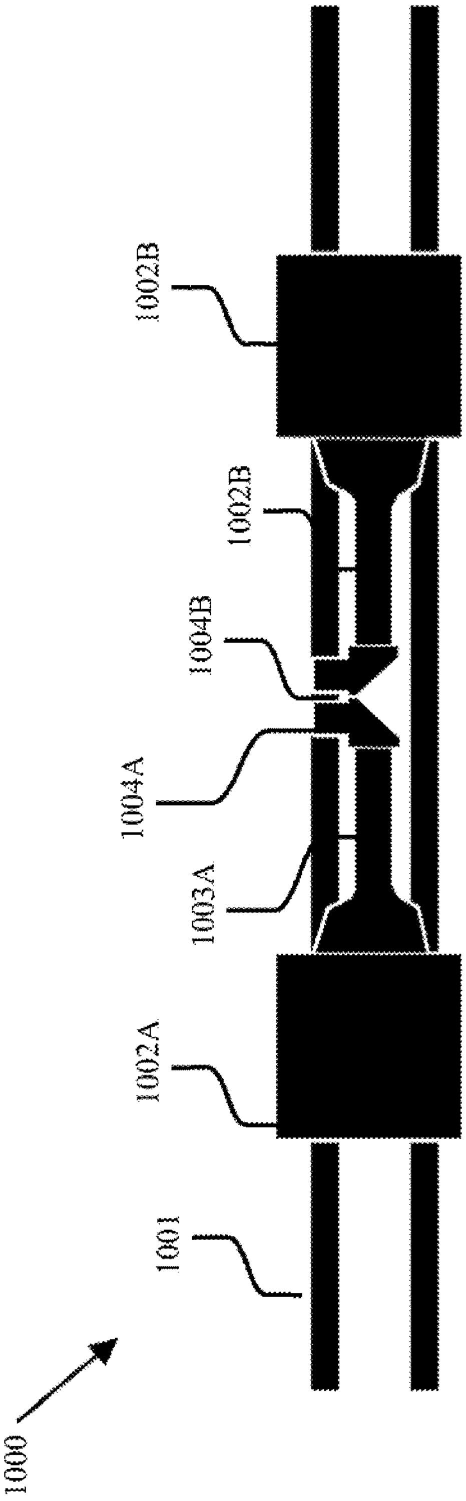
FIG. 11A shows a non-limiting top-view illustration of a periscopic side-by-side rig, per an embodiment herein.
Figure 11B:
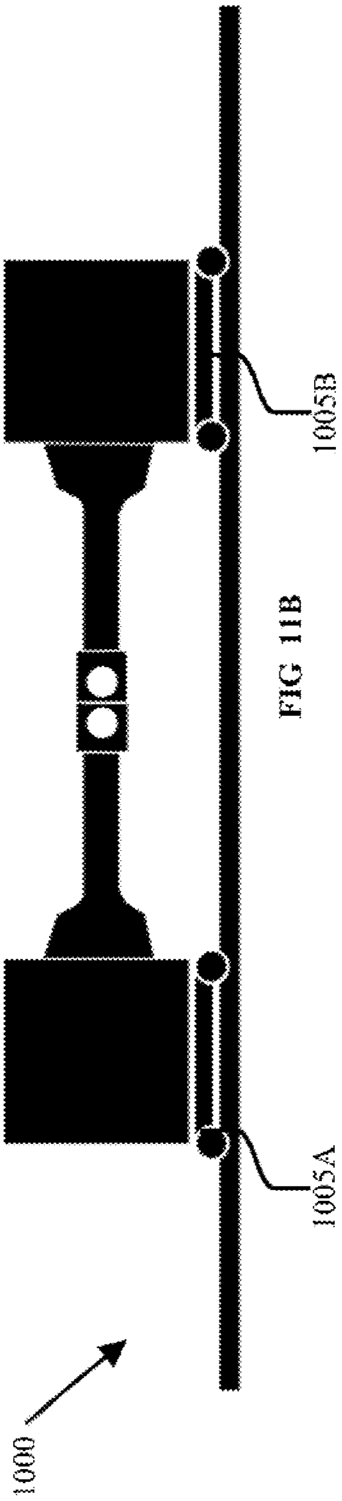
FIG. 11B shows a non-limiting side-view illustration of a periscopic side-by-side rig, per an embodiment herein.

FIG. 11A shows a non-limiting top-view illustration of a periscopic side-by-side rig 1400. FIG. 11B shows a non-limiting side-view illustration of the periscopic side-by-side rig 1100. As shown the periscopic side-by-side rig 1100 comprises a rails 1101, a first motorized chassis 1105A translating a first camera 1102A along the rails 1101 and a second motorized chassis 1105B translating a second camera 1102B along the rails 1101. Further as shown, the first camera 1102A is attached to a first probe lens 1103A, which is coupled to a first periscopic mirror 1104A, and the second camera 1102B is attached to a second probe lens 1103A, which is coupled to a second periscopic mirror 1104B. In some embodiments, the first motorized chassis 1105A and the second motorized chassis 1105B are configured to respectively translate the first camera 1102A and the second camera 1102B independently along the rails 1101. In some embodiments, the first motorized chassis 1105A and the second motorized chassis 1105B are configured to respectively translate the first camera 1102A and the second camera 1102B concurrently along the rails 1101. In some embodiments, the first motorized chassis 1105A and the second motorized chassis 1105B are configured to respectively translate the first camera 1102A with respect to the second camera 1102B. As shown, the first periscopic mirror 1104A and the second periscopic mirror 1104B accept light from a plane perpendicular to the rails 1101. Alternatively, in some embodiments, the first periscopic mirror 1104A and the second periscopic mirror 1104B accept light from a plane parallel to the rails 1101

Hybrid Three-Dimensional Media

The devices and methods described can capture and present hybrid three-dimensional media with a broad array of focal distances to form a fluid and continuous presentation of two and three-dimensional media without the need for expensive post-production edits. As such the devices and methods herein are capable of capturing and displaying a broader array of expressions and emotions.

Figure 1C:
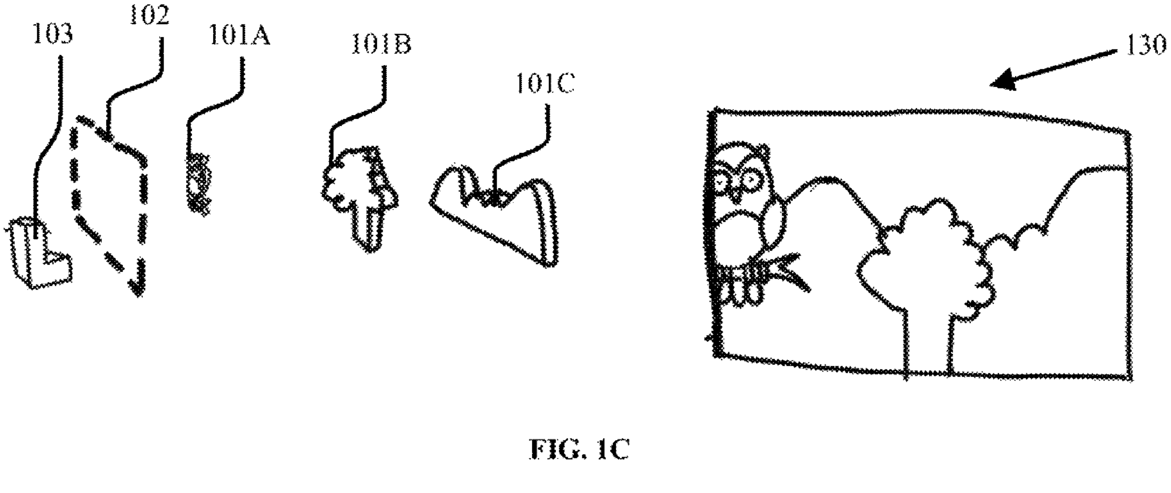
FIG. 1C shows a non-limiting diagram of a content plane and viewing window for a hybrid three-dimensional media, per an embodiment herein.
Figure 7:
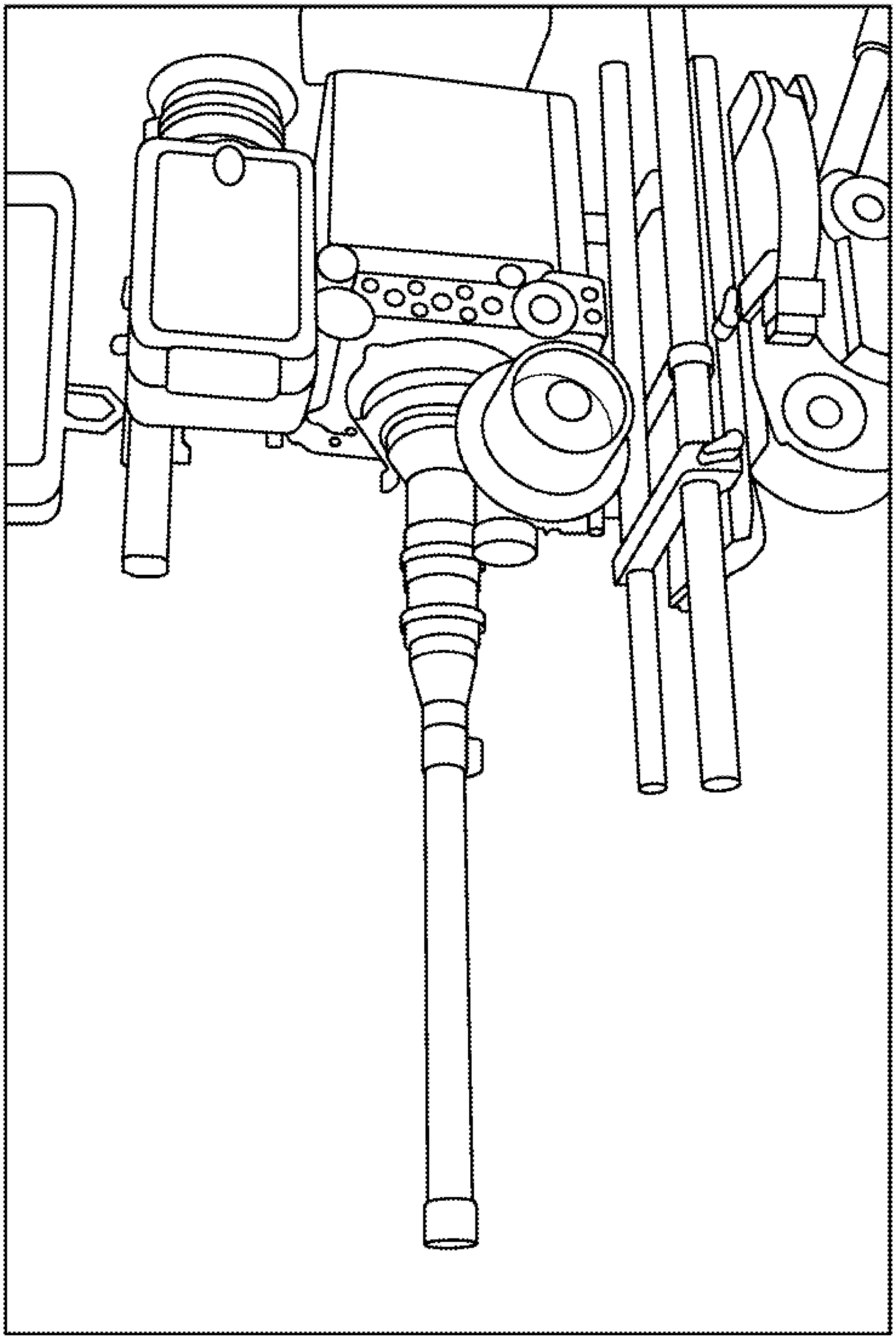
FIG. 7 shows a non-limiting exemplary image of a fourth system for capturing a three-dimensional video, per an embodiment herein.
Figure 10A:
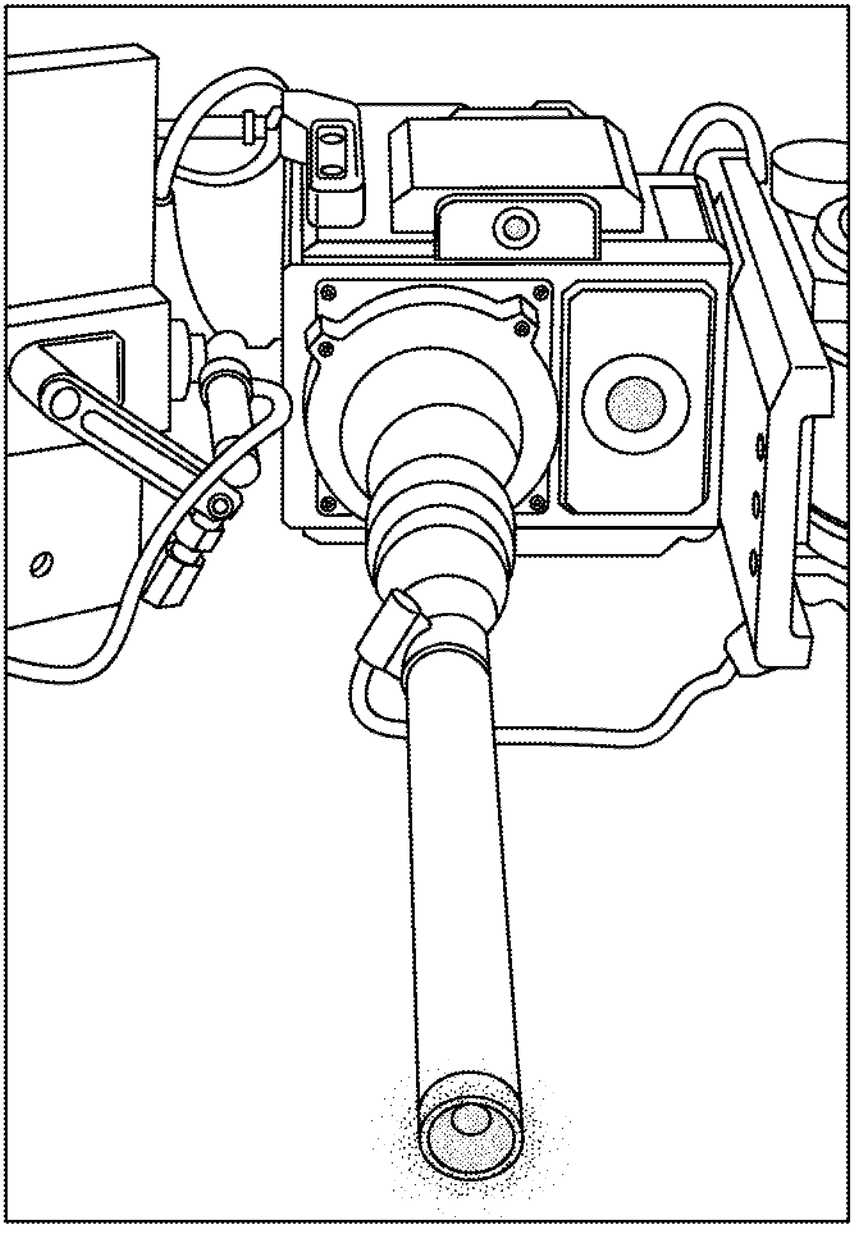
FIG. 10A shows a non-limiting image of a probe lens, per an embodiment herein.
Figure 10B:
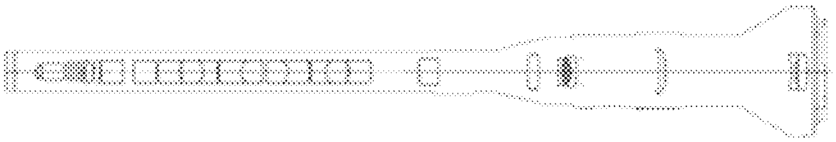
FIG. 10B shows a non-limiting diagrams of the components of a probe lens, per an embodiment herein.
Figure 10C:
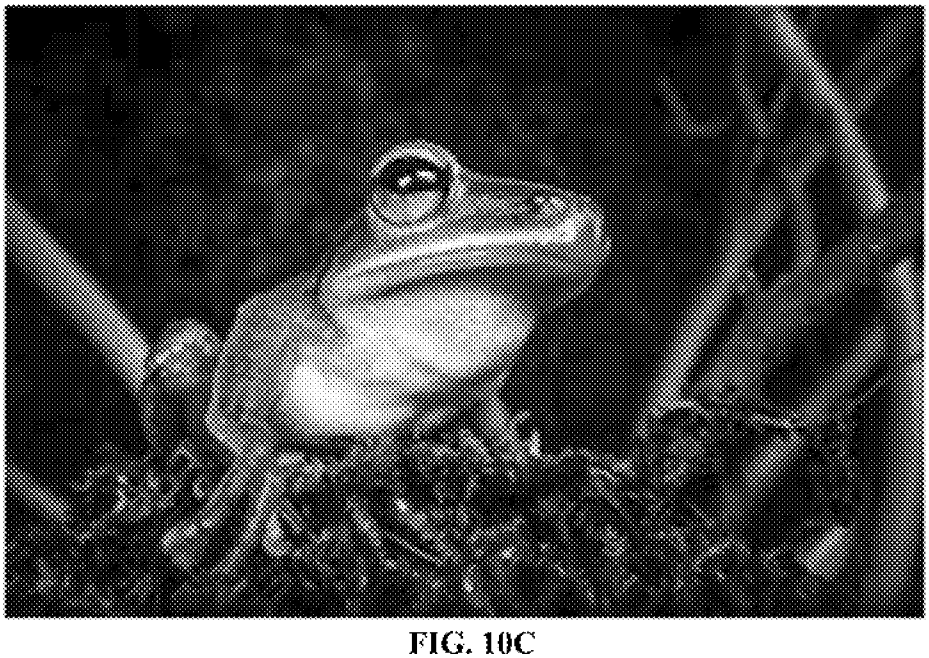
FIG. 10C shows a non-limiting macro wide shot image captured with a probe lens.

FIG. 7 shows an exemplary device capturing hybrid three-dimensional media. The device shown therein employs a combination of probe lens, periscopic, and miniature fisheye lenses to capture three-dimensional images with a wide array of camera spacing distances. In some embodiments, the device comprises two or more cameras, each camera coupled to a probe lens. FIG. 10A shows a non-limiting image of a probe lens. FIG. 10B shows a non-limiting diagrams of the components of a probe lens. A probe lens is a long lens generally designed for macro photography and video that comprises a series of small lenses that delivers light to a sensor, regardless of the sensor's size, and supports a wide field of view. FIG. 10C shows a non-limiting macro wide shot image captured with a probe lens. In some embodiments, the probe lens is a straight probe lens. In some embodiments, the probe lens is a curved probe lens. Such broad camera spacing distance enables media capture both below the interaxial separation distance available in side-by-side three-dimensional cameras and below the minimum focal length available with beam-splitter arrays. The ability of such cameras to capture hybrid three-dimensional media 130 below the minimal focal distance available in standard three-dimensional media 120, per FIG. 1C, enables a dynamic viewing window 102, such that multiple layered content planes 101A 101B 101C can be displayed to a viewer 103 at near proximities and far distances within focus while preventing window violations.

Figure 2D:
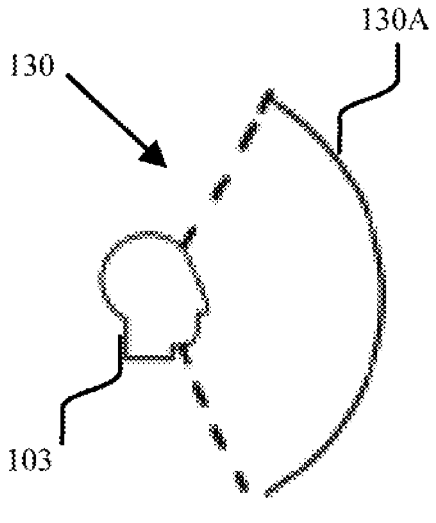
FIG. 2D shows a non-limiting diagram of the screen size and position relative to a viewer for a hybrid three-dimensional media, per an embodiment herein.
Figure 3D:
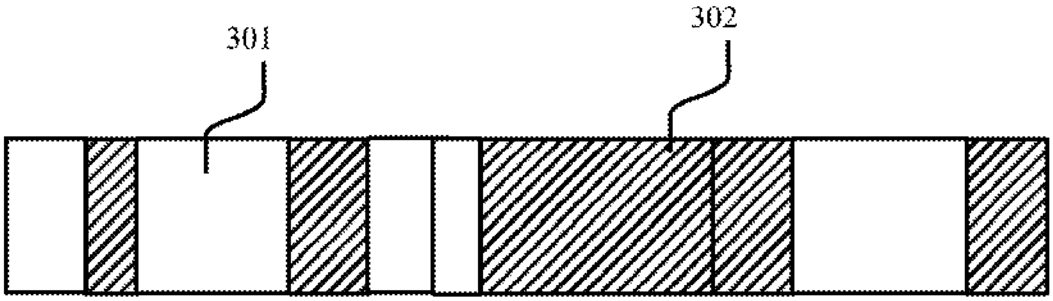
FIG. 3D shows a non-limiting diagram a film editing timeline for a hybrid media of two-dimensional three-dimensional, per an embodiment herein.

Further, in some embodiments per FIG. 2D, the hybrid three-dimensional media 130 only provides media within the viewer's 103 field of view 130A. As such media presentation appears to the viewer as they are looking through a window, the jarring effect of cutting between scenes are reduced or eliminated. Thus, per FIG. 3D, multiple short or long three-dimensional media scenes 302 can be presented consecutively or interspersed with a plurality of two-dimensional media scenes 301. In some embodiments, the hybrid three-dimensional media 130 has a hybrid aspect ratio.

Methods Systems and Media for Forming a Unidirectional Immersive Three-Dimensional Video Provided herein are computer-implemented methods, computer-implemented systems, and non-transitory computer-readable storage media that form a unidimensional immersive three-dimensional video. In some embodiments, the methods or applications perform: receiving a plurality of first two-dimensional images captured from a first point of view; receiving a plurality of second two-dimensional images captured during the capture of the plurality of first two-dimensional images and from a second point of view that is different from the first point of view; overlaying a first image window over each of the plurality of first two-dimensional images; overlaying a second image window over each of the plurality of second two-dimensional images; and combining the plurality of overlaid first two-dimensional images and the plurality of overlaid second two-dimensional images to form the unidirectional immersive three-dimensional video.

In some embodiments, the plurality of first two-dimensional images are captured from a first point of view. In some embodiments, the plurality of second two-dimensional images are captured from a second point of view. In some embodiments, the second point of view is different from the first point of view. In some embodiments, the plurality of second two-dimensional images are captured during the capture of the plurality of first two-dimensional images. In some embodiments, the first point of view and the second point of view are separated by about 0.25 inches to about 600 inches. In some embodiments, a first viewing axis of the first point of view and a second viewing axis of the second point of view are parallel. In some embodiments, a first viewing axis of the first point of view and a second viewing axis of the second point of view are oblique. In some embodiments, at least one of the plurality of second two-dimensional images and the plurality of first two-dimensional images are captured by a camera with a probe lens.

Figure 4A:
FIG. 4A shows a non-limiting example a first image window, per an embodiment herein.
Figure 4B:
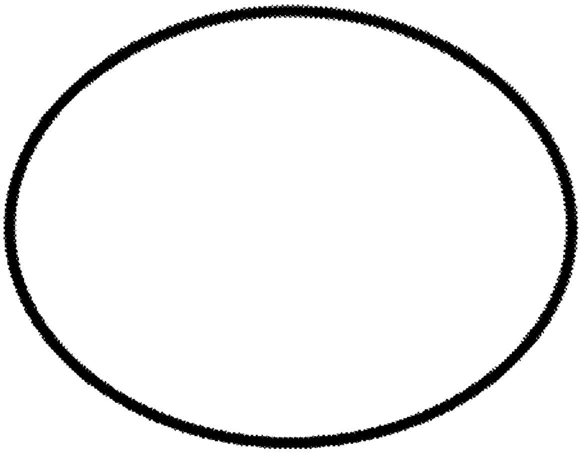
FIG. 4B shows a non-limiting example a second image window, per an embodiment herein.
Figure 4C:
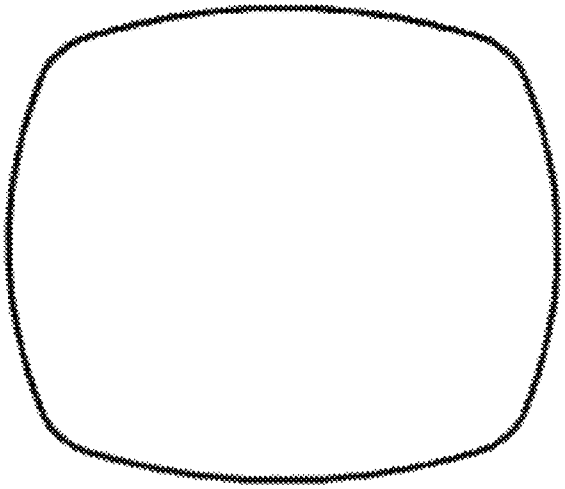
FIG. 4C shows a non-limiting example a third image window, per an embodiment herein.

FIG. 4A-4C show exemplary image windows comprising a square image window, a circular image window, and a hybrid image window, respectively. In some embodiments, each of the plurality of first two-dimensional images is overlaid with a first image window. In some embodiments, each of the plurality of second two-dimensional images is overlaid with a second image window. In some embodiments, the first image window and the second image window are congruent. In some embodiments, the first image window and the second image window are incongruent. In some embodiments, the first image window comprises a primary first image window for a first portion of the first two-dimensional images and a secondary first image window for a second portion of the first two-dimensional images. In some embodiments, the primary first image window and the secondary first image window are incongruent. In some embodiments, the second image window comprises a primary second image window for a second portion of the second two-dimensional images and a secondary second image window for a second portion of the second two-dimensional images. In some embodiments, the primary second image window and the secondary second image window are incongruent. In some embodiments, a vertical field of view of at least one of the first image window and the second image window is about 80 degrees to about 200 degrees. In some embodiments, a horizontal field of view of at least one of the first image window and the second image window is about 80 degrees to about 200 degrees. In some embodiments, at least one of the first image window and the second image window have a shape comprising a circle, a square, an oval, an ellipse, a rounded square, a polygon, or any combination thereof.

Multiplayer/Multiviewer Immersive VR

Figure 13:
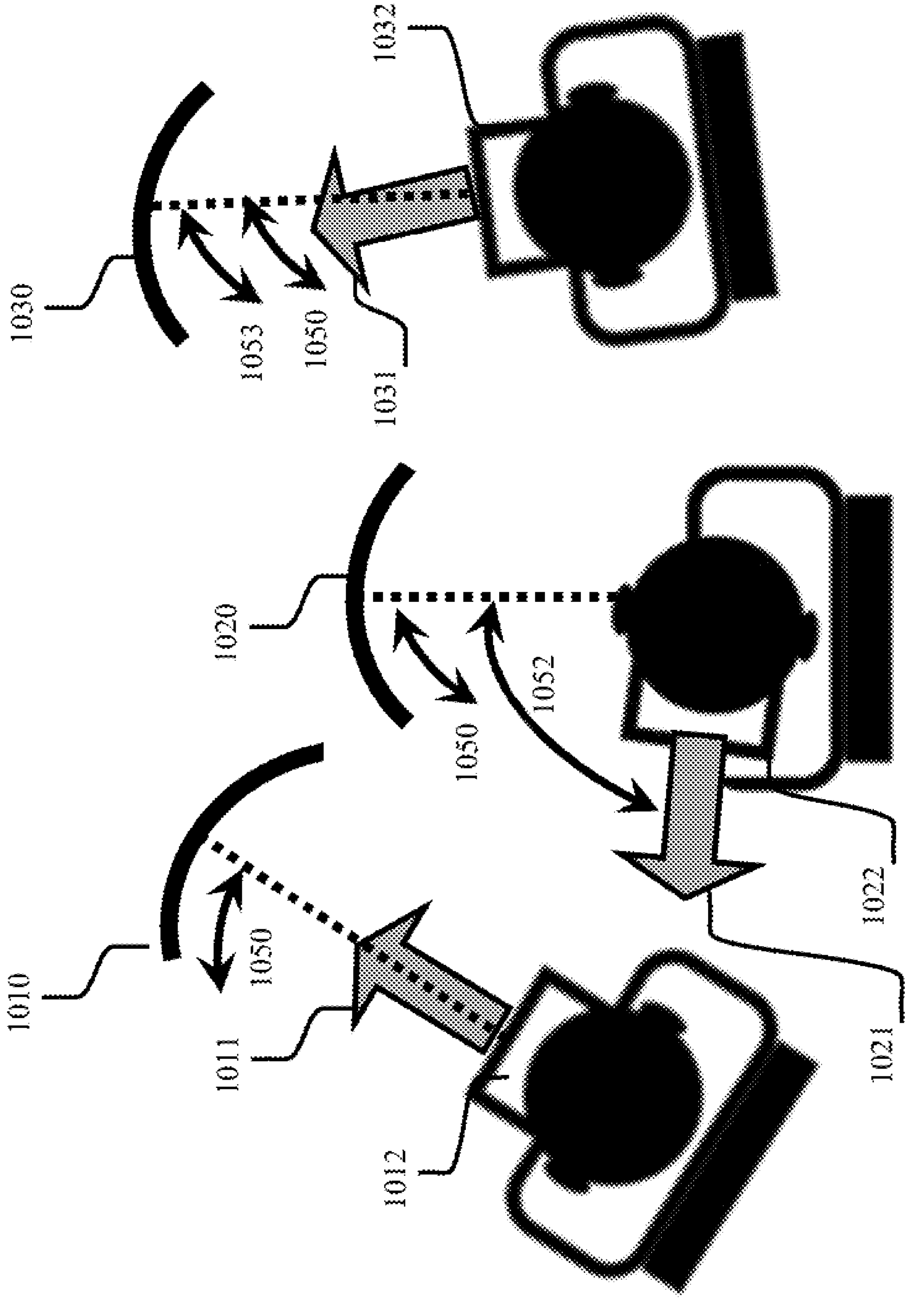
FIG. 13 shows a non-limiting top-view illustration of three people engaging with immersive content, per an embodiment herein.

FIG. 13 shows a non-limiting top-view illustration of three people engaging with immersive three-dimensional video. Another aspect provided herein are computer-implemented methods, systems, and non-transitory computer-readable storage media encoded with a computer program including instructions executable by a processor to create an application performing at least the following: receiving: an immersive three-dimensional video; a directional input 1010 1020 1030 for a location of the immersive three-dimensional video; an accelerometer measurement; and a see-through camera image of a virtual reality headset 1012 1022 1032; determining a relative orientation angle 1050 between the directional input 1010 1020 1030 and a viewing direction 1011 1021 1031 of the virtual reality headset 1012 1022 1032, about one or more axis; displaying, on a screen of the virtual reality headset 1012 1022 1032, the immersive three-dimensional video when the relative orientation angle 1050 is within a set angle 1050; and displaying, on the screen of the virtual reality headset 1012 1022 1032, the see-through camera image when the relative orientation angle 1050 is greater than the set angle 1050.

In some embodiments, the set angle 1050 is about 60 degrees to about 180 degrees. In some embodiments, the application further performs fading the immersive three-dimensional video, the see-through camera image, or both, when the relative orientation angle is within a threshold from the set angle 1050. In some embodiments, the threshold is about 5 degrees to about 30 degrees.

As shown therein, the relative orientation angle between the directional input 1010 of a first user and the viewing direction 1011 of the virtual reality headset 1012 of the first user is about 0, so the first user is shown the immersive three-dimensional video. Further, the relative orientation angle 1052 between the directional input 1020 of a second user and the viewing direction 1021 of the virtual reality headset 1022 of the second user is greater than the set value 1050, so the second user is shown see-through camera image. Additionally, the relative orientation angle 1050 between the directional input 1053 of a third user and the viewing direction 1031 of the virtual reality headset 1032 of the third user is less than the set value 1050, so the third user is shown the immersive three-dimensional video.

In some embodiments, each player's headset has a pass-through camera to capture the other co-players. In some embodiments, the pass-through camera is located on the headset of the player. In some embodiments, the pass-through camera is located on a peripheral of the headset of the player. In some embodiments, one or more of the players selects a relative location of the immersive three-dimensional video. In some embodiments, the hybrid three-dimensional media and/or the media captured by the side-by-side rig describe herein is further configured to enable multiple players, wherein two or more players interact with each other and immersive three-dimensional video.

Such embodiments enable teams of coworkers to practice cooperative exercises, enable true multi-player games, and family interaction from a distance. Such embodiments further enable two more players to simultaneously view a content (e.g. a movie or a game), wherein the content is displayed at a selected direction. In some embodiments, when the second player's perspective shifts away from the first player and towards the selected direction, the immersive three-dimensional video fades into view. In some embodiments, when the first player's perspective shifts from the selected direction and to the third player, the immersive three-dimensional video fades away. Such a setup enables users to select to be immersed in the immersive three-dimensional video or not depending on their direction of viewing for improved social integration.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" in some cases refers to an amount that is approximately the stated amount.

As used herein, the term "about" refers to an amount that is near the stated amount by 10%, 5%, or 1%, including increments therein.

As used herein, the term "about" in reference to a percentage refers to an amount that is greater or less the stated percentage by 10%, 5%, or 1%, including increments therein.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Computing System

Figure 14:
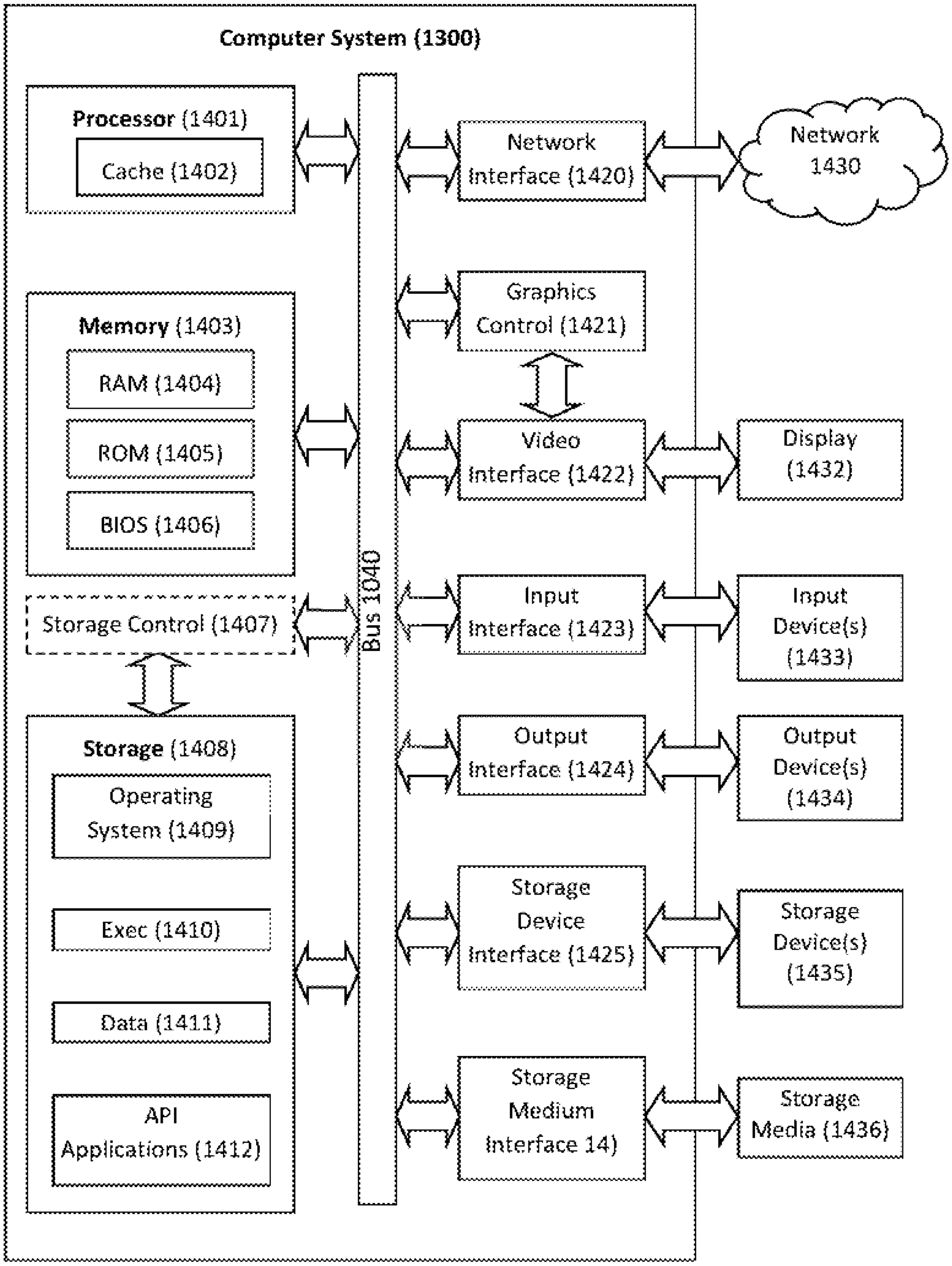
FIG. 14 shows a non-limiting example of a computing device; in this case, a device with one or more processors, memory, storage, and a network interface.

Referring to FIG. 14, a block diagram is shown depicting an exemplary machine that includes a computer system 1400 (e.g., a processing or computing system) within which a set of instructions can execute for causing a device to perform or execute any one or more of the aspects and/or methodologies for static code scheduling of the present disclosure. The components in FIG. 14 are examples only and do not limit the scope of use or functionality of any hardware, software, embedded logic component, or a combination of two or more such components implementing particular embodiments.

Computer system 1400 may include one or more processors 1401, a memory 1403, and a storage 1408 that communicate with each other, and with other components, via a bus 1440. The bus 1440 may also link a display 1432, one or more input devices 1433 (which may, for example, include a keypad, a keyboard, a mouse, a stylus, etc.), one or more output devices 1434, one or more storage devices 1435, and various tangible storage media 1436. All of these elements may interface directly or via one or more interfaces or adaptors to the bus 1440. For instance, the various tangible storage media 1436 can interface with the bus 1440 via storage medium interface 1426. Computer system 1400 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 1400 includes one or more processor(s) 1401 (e.g., central processing units (CPUs) or general purpose graphics processing units (GPGPUs)) that carry out functions. Processor(s) 1401 optionally contains a cache memory unit 1402 for temporary local storage of instructions, data, or computer addresses. Processor(s) 1401 are configured to assist in execution of computer readable instructions. Computer system 1400 may provide functionality for the components depicted in FIG. 14 as a result of the processor(s) 1401 executing non-transitory, processor-executable instructions embodied in one or more tangible computer-readable storage media, such as memory 1403, storage 1408, storage devices 1435, and/or storage medium 1436. The computer-readable media may store software that implements particular embodiments, and processor(s) 1401 may execute the software. Memory 1403 may read the software from one or more other computer-readable media (such as mass storage device(s) 1435, 1436) or from one or more other sources through a suitable interface, such as network interface 1420. The software may cause processor(s) 1401 to carry out one or more processes or one or more steps of one or more processes described or illustrated herein. Carrying out such processes or steps may include defining data structures stored in memory 1403 and modifying the data structures as directed by the software.

The memory 1403 may include various components (e.g., machine readable media) including, but not limited to, a random access memory component (e.g., RAM 1404) (e.g., static RAM (SRAM), dynamic RAM (DRAM), ferroelectric random access memory (FRAM), phase-change random access memory (PRAM), etc.), a read-only memory component (e.g., ROM 1405), and any combinations thereof. ROM 1405 may act to communicate data and instructions unidirectionally to processor(s) 1401, and RAM 1404 may act to communicate data and instructions bidirectionally with processor(s) 1401. ROM 1405 and RAM 1404 may include any suitable tangible computer-readable media described below. In one example, a basic input/output system 1406 (BIOS), including basic routines that help to transfer information between elements within computer system 1400, such as during start-up, may be stored in the memory 1403.

Fixed storage 1408 is connected bidirectionally to processor(s) 1401, optionally through storage control unit 1407. Fixed storage 1408 provides additional data storage capacity and may also include any suitable tangible computer-readable media described herein. Storage 1408 may be used to store operating system 1409, executable(s) 1410, data 1411, applications 1412 (application programs), and the like. Storage 1408 can also include an optical disk drive, a solid-state memory device (e.g., flash-based systems), or a combination of any of the above. Information in storage 1408 may, in appropriate cases, be incorporated as virtual memory in memory 1403.

In one example, storage device(s) 1435 may be removably interfaced with computer system 1400 (e.g., via an external port connector (not shown)) via a storage device interface 1425. Particularly, storage device(s) 1435 and an associated machine-readable medium may provide non-volatile and/or volatile storage of machine-readable instructions, data structures, program modules, and/or other data for the computer system 1400. In one example, software may reside, completely or partially, within a machine-readable medium on storage device(s) 1435. In another example, software may reside, completely or partially, within processor(s) 1401.

Bus 1440 connects a wide variety of subsystems. Herein, reference to a bus may encompass one or more digital signal lines serving a common function, where appropriate. Bus 1440 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1400 may also include an input device 1433. In one example, a user of computer system 1400 may enter commands and/or other information into computer system 1400 via input device(s) 1433. Examples of an input device(s) 1433 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 1433 may be interfaced to bus 1440 via any of a variety of input interfaces 1423 (e.g., input interface 1423) including, but not limited to, serial, parallel, game port, USB, FIREWIRE, THUNDERBOLT, or any combination of the above.

In particular embodiments, when computer system 1400 is connected to network 1430, computer system 1400 may communicate with other devices, specifically mobile devices and enterprise systems, distributed computing systems, cloud storage systems, cloud computing systems, and the like, connected to network 1430. Communications to and from computer system 1400 may be sent through network interface 1420. For example, network interface 1420 may receive incoming communications (such as requests or responses from other devices) in the form of one or more packets (such as Internet Protocol (IP) packets) from network 1430, and computer system 1400 may store the incoming communications in memory 1403 for processing. Computer system 1400 may similarly store outgoing communications (such as requests or responses to other devices) in the form of one or more packets in memory 1403 and communicated to network 1430 from network interface 1420. Processor(s) 1401 may access these communication packets stored in memory 1403 for processing.

Examples of the network interface 1420 include, but are not limited to, a network interface card, a modem, and any combination thereof. Examples of a network 1430 or network segment 1430 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 1430, may employ a wired and/or a wireless mode of communication. In general, any network topology may be used.

Information and data can be displayed through a display 1432. Examples of a display 1432 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 1432 can interface to the processor(s) 1401, memory 1403, and fixed storage 1408, as well as other devices, such as input device(s) 1433, via the bus 1440. The display 1432 is linked to the bus 1440 via a video interface 1422, and transport of data between the display 1432 and the bus 1440 can be controlled via the graphics control 1421. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 1432, computer system 1400 may include one or more other peripheral output devices 1434 including, but not limited to, an audio speaker, a printer, a storage device, and any combinations thereof. Such peripheral output devices may be connected to the bus 1440 via an output interface 1424. Examples of an output interface 1424 include, but are not limited to, a serial port, a parallel connection, a USB port, a FIREWIRE port, a THUNDERBOLT port, and any combinations thereof.

In addition or as an alternative, computer system 1400 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 15:
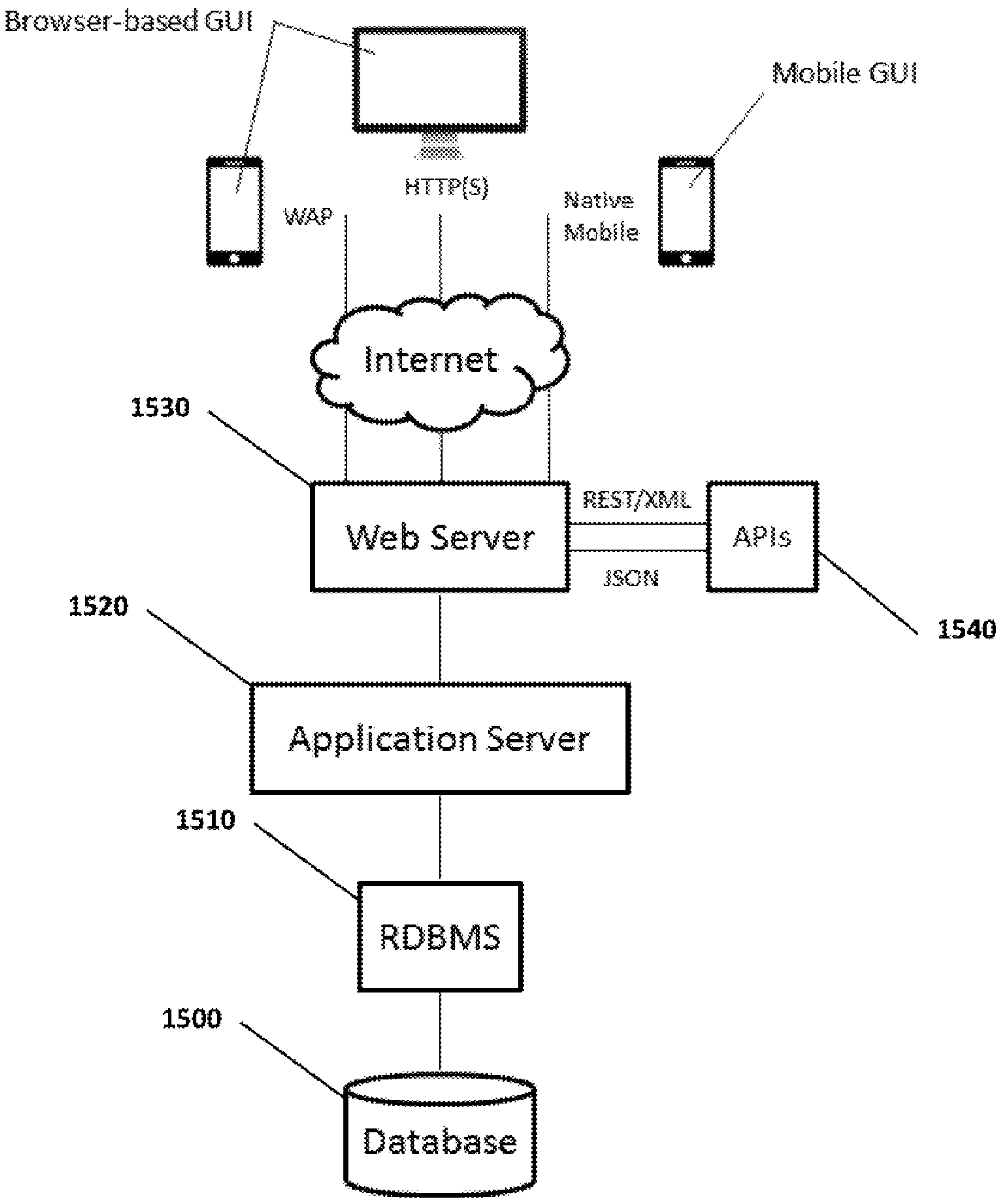
FIG. 15 shows a non-limiting example of a web/mobile application provision system; in this case, a system providing browser-based and/or native mobile user interfaces.

Referring to FIG. 15, in a particular embodiment, an application provision system comprises one or more databases 1500 accessed by a relational database management system (RDBMS) 1510. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 1020 (such as Java servers,.NET servers, PHP servers, and the like) and one or more web servers 1030 (such as Apache, IIS, GWS and the like). The web server(s) optionally expose one or more web services via app application programming interfaces (APIs) 1540. Via a network, such as the Internet, the system provides browser-based and/or mobile native user interfaces.

Figure 16:
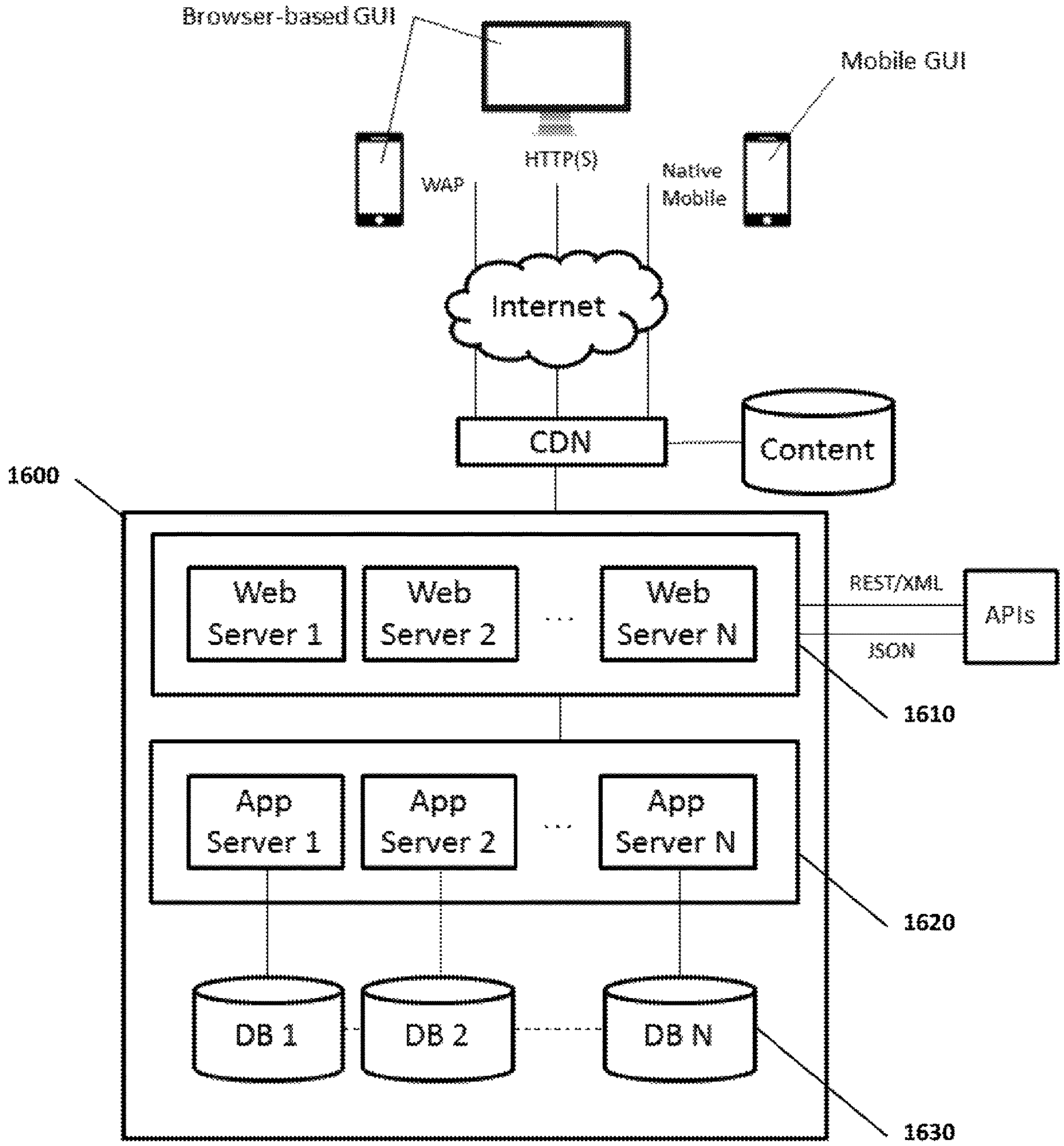
FIG. 16 shows a non-limiting example of a cloud-based web/mobile application provision system; in this case, a system comprising an elastically load balanced, auto-scaling web server and application server resources as well synchronously replicated databases.

Referring to FIG. 16, in a particular embodiment, an application provision system alternatively has a distributed, cloud-based architecture 1600 and comprises elastically load balanced, auto-scaling web server resources 1610 and application server resources 1620 as well synchronously replicated databases 1630.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite,.NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB.NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In a particular embodiment, a database is a distributed database. In other embodiments, a database is based on one or more local computer storage devices.

What is claimed is:

1. A computer-implemented method of forming a unidirectional immersive three-dimensional video comprising:

(a) receiving a plurality of first two-dimensional images captured from a first point of view;

(b) receiving a plurality of second two-dimensional images captured during the capture of the plurality of first two-dimensional images and from a second point of view that is different from the first point of view;

(c) overlaying a first image window over each of the plurality of first two-dimensional images, wherein overlaying the first image window comprises shaping the each of the plurality of first two-dimensional images to match a shape of the first image window, wherein the first image window does not comprise the plurality of second two-dimensional images;

(d) overlaying a second image window over each of the plurality of second two-dimensional images, wherein overlaying the second image window comprises shaping the each of the plurality of second two-dimensional images to match a shape of the second image window, wherein the second image window does not comprise the plurality of first two-dimensional images; and (e) combining the plurality of overlaid first two-dimensional images and the plurality of overlaid second two-dimensional images to form the unidirectional immersive three-dimensional video.

2. The method of claim 1, wherein at least one image of the plurality of first and/or second two-dimensional images is captured using a cell phone, smartphone, tablet, or a film-making camera.

3. The method of claim 2, wherein the cell phone, smartphone, or tablet comprises a side-by-side mobile device comprising (a) at least one of a right wide sensor, a right medium sensor, or a right long sensor, (b) at least one of a left wide sensor, a left medium sensor, and a left long sensor, (c) a right microphone, and (d) a left microphone, wherein the right wide sensor, the right medium sensor, the right long sensor, the left wide sensor, the left medium sensor, the left long sensor, or any combination thereof is configured to capture the plurality of first and/or second three-dimensional images.

4. The method of claim 3, wherein a distance between the centerpoints of the right wide sensor and the left wide sensor, the right medium sensor and the left medium sensor, the right long sensor and the left long sensor or any combination thereof is between 0.25 inches to 600 inches.

5. The method of claim 3, wherein a distance between the centerpoints of the right wide sensor and the left wide sensor, the right medium sensor and the left medium sensor, the right long sensor and the left long sensor or any combination thereof is adjustable between 0.25 inches to 600 inches.

6. The method of claim 1, wherein the unidirectional immersive three-dimensional video is viewable on a cell phone, a smartphone, a tablet, mixed-reality goggles, hybrid augmented reality goggles, virtual reality goggles, or a wearable headset.

7. The method of claim 1, further comprising:

(a) receiving:
   (i) the unidirectional immersive three-dimensional video;
   (ii) a directional input for a location of the unidirectional immersive three-dimensional video;
   (iii) an accelerometer measurement; and
   (iv) a see-through camera image of a virtual reality headset;
(b) determining a relative orientation angle between the directional input and a viewing direction of the virtual reality headset, about one or more axes;
(c) displaying, on a screen of the virtual reality headset, the unidirectional immersive three-dimensional video when the relative orientation angle is within a set angle; and
(d) displaying, on the screen of the virtual reality headset, the see-through camera image when the relative orientation angle is greater than the set angle.

8. The method of claim 7, wherein the displaying of the see-through camera image in (d) permits a user who is wearing the virtual reality headset to detect, observe or sense a surrounding environment proximal to the user.

9. The method of claim 7, wherein the displaying of the see-through camera image in (d) permits a user who is wearing the virtual reality headset to detect, observe or sense a reaction or presence of another adjacent user who is wearing another virtual reality headset.

10. The method of claim 7, wherein the see-through camera is configured to capture other users and located in a peripheral of the virtual reality headset worn by the user.

11. The method of claim 7, wherein the unidirectional immersive three-dimensional video fades into view of the user as the user's perspective shifts away from another player.

12. The method of claim 7, wherein another player fades into view of the user as the user's perspective shifts away from the unidirectional immersive three-dimensional video.

13. The method of claim 7, wherein the set angle is 60 degrees to 180 degrees.

14. The method of claim 7, further comprising fading the unidirectional immersive three-dimensional video, the see-through camera image, or both, when the relative orientation angle is within a threshold from the set angle, wherein the threshold is 5 degrees to 30 degrees.

15. The method of claim 1, wherein a first viewing axis of the first point of view and a second viewing axis of the second point of view are parallel or oblique.

16. The method of claim 1, wherein the first image window and the second image window are congruent or incongruent.

17. The method of claim 1, wherein the first image window comprises a primary first image window for a first portion of the first two-dimensional images and a secondary first image window for a second portion of the first two-dimensional images, and wherein the second image window comprises a primary second image window for a second portion of the second two-dimensional images and a secondary second image window for a second portion of the second two-dimensional images.

18. The method of claim 17, wherein the primary second image window and the secondary second image window are incongruent.

19. The method of claim 1, wherein a vertical and/or horizontal field of view of at least one of the first image window and the second image window is 80 degrees to 200 degrees.

20. The method of claim 1, wherein at least one of the plurality of second two-dimensional images and the plurality of first two-dimensional images are captured by a camera with a probe lens.

21. The method of claim 1, further comprising forming a hybrid unidirectional immersive three-dimensional video by combining the unidirectional immersive three-dimensional video with:

(i) a plurality of two dimensional images of the plurality of first two-dimensional images captured from a first point of view,
(ii) the plurality of second two-dimensional images captured during the capture of the plurality of first two-dimensional images and from a second point of view that is different from the first point of view, or
(iii) both, such that scenes from the unidirectional immersive three-dimensional video are interspersed with a plurality of two-dimensional media scenes from (i), (ii), or (iii).

22. The method of claim 17, wherein an entirety of each of the first image window and the second image window comprise one or more shapes.

23. The method of claim 1, wherein the shape of the first image window is different from the shape of the second image window.

24. The method of claim 7, wherein the viewing direction comprises a direction of a head together with the virtual reality headset.

25. The method of claim 1, further comprising:

(a) receiving, for each user of a plurality of users:
   (i) the unidirectional immersive three-dimensional video;
   (ii) a directional input for a location of the unidirectional immersive three-dimensional video;
   (iii) an accelerometer measurement; and
   (iv) a see-through camera image of a virtual reality headset;
(b) determining, for the each user of the plurality of users, a relative orientation angle between the directional input and a viewing direction of the virtual reality headset, about one or more axes;

(c) displaying, on a screen of each virtual reality headset, the unidirectional immersive three-dimensional video when the relative orientation angle is within a set angle; and (d) displaying, on the screen of the each virtual reality headset, the see-through camera image when the relative orientation angle is greater than the set angle, wherein at least one user of the plurality of users is shown the see-through camera image and at least one user of the plurality of users is shown the immersive three-dimensional video.

26. The method of claim 25, further comprising allowing, via the screen of the each virtual reality headset, the each user to independently decide whether to view the see-through camera image or the immersive three-dimensional video depending on the each user's viewing direction.

27. The method of claim 1, further comprising:

(a) receiving, for each user of a plurality of users:

(i) the unidirectional immersive three-dimensional video;

(ii) a directional input for a location of the unidirectional immersive three-dimensional video;

(iii) an accelerometer measurement;

(iv) a see-through real-world camera image of a virtual reality headset; and (v) a see-through camera image of other users of the plurality of users;

(b) determining, for the each user of the plurality of users, a relative orientation angle between the directional input and a viewing direction of the virtual reality headset, about one or more axes;

(c) displaying, on a screen of each virtual reality headset, the unidirectional immersive three-dimensional video when the relative orientation angle is within a set angle; and (d) displaying, on the screen of the each virtual reality headset, the see-through real-world camera image when the relative orientation angle is greater than the set angle, wherein the see-through camera image of other users is configured to allow each user to see the other users while viewing either the unidirectional immersive three-dimensional video or the see-through real-world camera image.

* * * * *